United States Patent
Fischer

(10) Patent No.: US 6,675,055 B1
(45) Date of Patent: *Jan. 6, 2004

(54) METHOD AND APPARATUS FOR AN AUTOMATED INJECTION MOLDING CONFIGURING AND MANUFACTURING SYSTEM

(75) Inventor: Jonathon Fischer, Ontario (CA)

(73) Assignee: Mold Masters Ltd., Georgetown (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 407 days.

(21) Appl. No.: 09/595,154

(22) Filed: Jun. 16, 2000

(51) Int. Cl.$^7$ .............................................. G06F 19/00
(52) U.S. Cl. ........................................ 700/97; 700/200
(58) Field of Search ............................ 700/100, 97, 67, 700/18, 180, 200, 201; 264/297.2, 297.3

(56) References Cited

U.S. PATENT DOCUMENTS

| | | | |
|---|---|---|---|
| 5,007,821 A | 4/1991 | Schmidt | 425/548 |
| 5,103,421 A | 4/1992 | Ward et al. | 395/700 |

(List continued on next page.)

FOREIGN PATENT DOCUMENTS

| | | |
|---|---|---|
| EP | 314 595 A2 | 5/1989 |
| GB | 2 325 996 A | 12/1998 |

OTHER PUBLICATIONS

Husky Brochure, "PRONTO ™ SP–Series Hot Runner System" Jun. 2000.
Husky Brochure, "PRONTO ™ Complete Hot Runner Systems—4–Week Delivery", Jun. 2000.
Roller, D., Schafer, D.: Parametische Modellierung—Situationsanalyse und Trends; in: CAD/CAM, No. 5, 1998, pp. 96–104, (Translation submitted).
Gausemeier, J. et al., Produktentwicklung im weltweiten Netzwerk; in: ZWK 91, 1996, No. 7–8, pp. 323–325, (Translation submitted).
Proc. Of the 3$^{rd}$ Int. Conf. Computer Integrated Manufacturing; vol. 1, 1995, pp. 29–36, 82–89, 143–150 and 295–310.
Mastip Technolog Ltd, "*Technical Information)*", pp. 1–2, 1999.
Mastip Technolog Ltd, "*MT Nozzle Series)*", pp. 1–5, 1999.
Eurotool, "Navigator", Interactive Hot Runner System Selection, Dos V 1.7, No Date.
International Search Report dated Jun. 12, 2003, for PCT/IB 01/01072.

*Primary Examiner*—Leo Picard
*Assistant Examiner*—Kidest Bahta
(74) *Attorney, Agent, or Firm*—McDonnell Boehnen Hulbert & Berghoff

(57) ABSTRACT

The method and apparatus of the present invention includes a computer implemented injection molding configuring subsystem which enables a customer to interactively specify and design a system using a mix of parameters that the customer specifies and are manufacturing process determined. The configuring subsystem is connected to a computer network such as the Internet. The method and apparatus of the present invention further includes a computerized business and processing subsystem in communication with the configuring subsystem. The computerized business subsystem automatically provides a cost and schedule for a system configured by the configuring subsystem and additionally processes an order for the system. The processing subsystem automatically processes the customer's inputs and generates drawings for the configured system.

31 Claims, 36 Drawing Sheets

U.S. PATENT DOCUMENTS

| | | | |
|---|---|---|---|
| 5,366,369 A | 11/1994 | Gellert | 425/549 |
| 5,421,716 A | 6/1995 | Gellert | 425/549 |
| 5,441,197 A | 8/1995 | Gellert et al. | 228/248 |
| 5,463,555 A | 10/1995 | Ward et al. | 364/468 |
| 5,508,909 A * | 4/1996 | Maxwell et al. | 700/18 |
| 5,539,650 A | 7/1996 | Hehl | |
| 5,658,604 A | 8/1997 | Gellert et al. | 425/549 |
| 5,705,202 A | 1/1998 | Gellert | 425/549 |
| 5,707,664 A | 1/1998 | Mak | 425/549 |
| 5,765,137 A | 6/1998 | Lee | 705/7 |
| 5,802,497 A | 9/1998 | Manasse | 705/27 |
| 5,805,442 A * | 9/1998 | Crater et al. | 340/3.7 |
| 5,839,117 A | 11/1998 | Cameron et al. | 705/27 |
| 5,847,957 A | 12/1998 | Cohen et al. | 364/468 |
| 5,849,343 A | 12/1998 | Gellert et al. | 425/549 |
| 5,857,201 A | 1/1999 | Wright, Jr. et al. | 707/104 |
| 5,870,719 A | 2/1999 | Maritzen et al. | 705/26 |
| 5,894,571 A | 4/1999 | O'Connor | 395/652 |
| 5,895,454 A | 4/1999 | Harrington | 705/26 |
| 5,952,016 A | 9/1999 | Gellert | 425/190 |
| 5,960,411 A | 9/1999 | Hartman et al. | 705/26 |
| 5,970,475 A | 10/1999 | Barnes et al. | 705/27 |
| 5,991,739 A | 11/1999 | Cupps et al. | 705/26 |
| 5,995,757 A | 11/1999 | Amberg et al. | 395/712 |
| 6,061,603 A * | 5/2000 | Papadopoulos et al. | 700/67 |
| 6,173,210 B1 * | 1/2001 | Bjornson et al. | 700/100 |
| 6,341,271 B1 * | 1/2002 | Salvo et al. | 264/40.1 |

* cited by examiner

MERLIN™ Configurator

MOLD - MASTERS

▸ Merlin™ Home  ▸ Merlin™ Support

Sub Manifold Pitch Selection
Click HERE for more detailed information

[Previous Step]

Click the Next button to accept this dimension or enter a smaller pitch dimension for your application if required.

Off Pitch X: [190]  [mm ▼]

[Next]   342

Relevant Catalog Pages

| Catalog Page | Title | Revision Date | CAD Drawings |
|---|---|---|---|
| [View] | M8.01.05 Mim Dura Hecto Valve nozzle L=120 | Jun 6 2000 12:41AM | [Download] |
| [View] | M8.01.05 MDH C VALVE TS0664 + TSL229 | Jun 6 2000 12:41AM | [Download] |
| [View] | M8.01.05 MIM Dura Hecto-Shot ® Bi-Metallic C-Valve | Jun 6 2000 12:41AM | [Download] |

FIG. 18

MERLIN™ Configurator

> Merlin™ Home  > Merlin™ Support

M O L D - M A S T E R S

MIM Dura Hecto-Shot ® Bi-Metallic C-Valve

Location Ring
Please select the locating ring you require, or click HERE for more information.

[Previous Step]

| Matches | Locating Ring # | Description | Diameter (mm) |
|---|---|---|---|
| 1 | LR0070 | Loc. ring for machine nozzle pad | 101.34 |
| 2 | LR0071 | Loc. ring for machine nozzle pad | 109.75 |
| 3 | LR0081 | Locating Ring for Valve system with BP58, inch | 101.36 |
| 4 | LR0082 | Locating Ring for Valve system with BP58, metric | 109.77 |
| 5 | LR0086 | Locating Ring for Sprue system with BP58, inch | 101.36 |
| 6 | LR0087 | Locating Ring for Sprue system with BP58, metric | 109.77 |

☐ Gate Seal ☐ Water Cooled Gate Insert ☐ Locating Ring
☐ Nozzle ☐ Valve Actuator ☐ Manifold Plates
☐ Manifold ☐ Inlet Component

Relevant Catalog Pages

| Catalog Page | Title | Revision Date | CAD Drawings |
|---|---|---|---|
| [View] 10.01.11 | Manifold center heater | 98-Oct-22 | [Download] |
| [View] 12.01.12 | Hydraulic/Pneumatic Cylinder Assembly | 98-Oct-22 | [Download] |
| [View] M8.02.02 | 2-Inline Sub Manifold | Jun | [Download] |
| [View] M8.01.05 | Mim Dura Hecto Valve nozzle L=120 | Jun 6 2000 12:41 AM | [Download] |
| [View] M8.01.05 | MDH C VALVE TS0664 + TSL229 | Jun 6 2000 12:41 AM | [Download] |
| [View] M8.01.05 | MIM Dura Hecto-Shot ® Bi-Metallic C-Valve | Jun 6 2000 12:41 AM | [Download] |

MERLIN™ Configurator — MOLD-MASTERS

▸ Merlin™ Home   ▸ Merlin™ Support

Application Information Form
Please fill in the relevant information and check for correctness.

[Previous Step]

Action To Be Taken. For more information click HERE

Company Name:          Contact Name: [ ]

Mold Maker: [ ]    Molder: [ ]    End User: [ ]

Customer Ref. #: [ ]    Requested Delivery Date: [ ] (in MM/DD/YYYY format)

Plastic Part #: [ ]    Plastic Part Name: [ ▼]    Industry Segment: [ ]

Additional Information

| Material | Part | Mold | Other |
|---|---|---|---|
| Material type: Acrylonitrile Butadiene Styr. | Shot Weight: 500 - 3500 g | # of Cavities: [ ] | Gate Cosmetics: [ ▼] |
| Grade: [ ] | Est. Injection Time (sec.): [ ] | Sub-runners: [ ▼] | Gate Cooling: [ ▼] |
| Supplier: [ ▼] | Wall Thickness: [ ] [mm ▼] | Gate: [ ] [mm ▼] | Dim. Stability: [ ▼] |
| Process Temp: [ ] [C ▼] | Flow Length: [ ] [mm ▼] | Land: [ ] [mm ▼] | Supp. Screws: [ ▼] |

FIG. 29

Generated Drawings

Choose any of the file options below to download or view online

| Type | Drawings | Options |
|---|---|---|
| TIF | GT_sys_valve_config_HY6600_0077.tif (1449539 Bytes) | Download / 602<br>View ⸺ 604 |
| TIF | GT_sys_valve_config_SYSTEM_ASSEMBLY_.tif (1170968 Bytes) | Download<br>View |
| DXF | GT_sys_valve_config_HY6600_0077.dxf (1095118 Bytes) | Download<br>View |
| DXF | GT_sys_valve_config_SYSTEM_ASSEMBLY.dxf (1786603 Bytes) | Download<br>View |
| IGS | GT_sys_valve_config_HY6600_0077.igs (2487962 Bytes) | Download<br>View |
| IGS | GT_sys_valve_config_SYSTEM_ASSEMBLY.igs (2302724 Bytes) | Download<br>View |
| WRL | GeneralAssembly.wrl (2461551 Bytes) | Download<br>View |

FIG. 31

METHOD AND APPARATUS FOR AN AUTOMATED INJECTION MOLDING CONFIGURING AND MANUFACTURING SYSTEM

CROSS REFERENCE TO RELATED APPLICATIONS

The present application relates to the commonly assigned U.S. patent application Ser. No. 09/595,133, entitled "Method for Fast Manufacturing and Assembling of Hot Runner Systems," filed concurrently with the present application on Jun. 16, 2000, and specifically incorporated in its entirety herein by reference.

FIELD OF THE INVENTION

This present invention relates to injection molding systems. More specifically, it relates to a method and apparatus for an automated injection molding configuring and manufacturing systems.

BACKGROUND OF THE INVENTION

In many manufacturing businesses the time from the initial customer contact to the release of components or systems for production is a critical path. Current processes and tools in place in many manufacturing processes, in particular, injection molding processes cannot support the order volume desired by the manufacturers.

Injection molding is a process by which some malleable material is forced under pressure into a closed mold. The material solidifies and retains the shape of the mold. Thermoplastic materials, thermosetting materials and some ceramic materials can be processed in this way. In a typical injection molding process, a material is melted and injected into a mold that has been clamped shut. The material freezes in the relatively colder mold and is then ejected.

At the beginning of the molding cycle, the molten material is injected into the mold through a sprue bushing, runner, and gate. During injection, the molten material (the "melt") is subject to a cooling effect by contact with the relatively lower temperature surface of the mold, but is also subject to a heating effect due to viscous dissipation in the melt. If the cooling effect is greater than the heating effect, the plastic may solidify before the mold is filled, resulting in an unfilled mold, i.e. a "short shot". If the heating effect dominates, the molding cycle may be unnecessarily extended for added cooling time. Because of the high volume rates of operation, even small gains or losses of time can be significant. The melt temperature and injection rate must be chosen so that neither of these problems occurs.

At the end of the injection period, the flow in the mold stops, the pressure rises rapidly, and the material begins to cool. As the material cools it shrinks slightly and more material may be forced into the cavity to the hold pressure acting on the melt. This portion of the molding cycle is called the "hold" or the "packing stage", and it continues until the hold pressure is released or until the gate freezes. After the gate has frozen, the material in the mold continues to cool, which at first causes a reduction in pressure, followed by shrinkage of the material in the cavity. When the molded part has cooled sufficiently to remain rigid, the mold may be opened and pins eject the molded part, runner, and sprue from the mold.

Over the last decade, the techniques for designing, building, and ordering injection molding processes have been improved to increase productivity. There are systems in place that support electronic versions of catalogs of injection molding components such as, those offered by Mold Masters Limited, the assignee of this invention, Hasco Yudo, Dynisco, Heatlock, Mastip and the National Tool and Manufacturing Co. Further, interactive systems for selection of components from standard component lists such as Eurotool offered by Navigator are known in the art. There are systems also in place that support automatic drawing generation of injection molding systems. Further, there are systems available that integrate a computerized business system with a computerized manufacturing system.

However, even with recent improvements, the current injection molding systems have several drawbacks. Specifically, problem areas include the inadequacy of specification and order systems. For example, such systems are typically confined to only limited off-the-shelf components and information. Further, some systems presently allow the user to specify and order injection molding systems, such as hot runner systems, even though the person ordering has insufficient knowledge or experience to specify the product design. The resulting product may not function or may even result in a safety concern. In addition, current systems still require manual human intervention downstream by the manufacturer's personnel such as, for example, by the engineers. Further, typically the current manufacturing systems include the manual generation of the manufacturing information, such as the tooling information.

Accordingly, it is desirable to automate and integrate the design, specification, configuration and order systems with the business and manufacturing systems to enable a real-time automated configuring and manufacturing system which overcomes the problems associated with the prior art.

SUMMARY OF THE INVENTION

The method and apparatus of the present invention includes an automated injection molding configuring and manufacturing system. A configuring subsystem in accordance with the present invention, enables customers to interactively create designs of their specific systems utilizing a web site.

In accordance with a preferred embodiment, the method of the present invention includes, configuring an injection molding system using a mix of customer determined parameters and manufacturer determined parameters. Further, the method includes using an input into the configuring subsystem for the generation of: (i) customer viewable models and drawings, (ii) engineering bill of materials, which may be subsequent input into a business subsystem, (iii) manufacturing drawings, and (iv) the machine tool codes, setups, and required tool lists. In a particular embodiment, the method of the present invention includes a processing subsystem that creates product drawings from the configured design. Further, the method includes verifying the configured design to ensure that the injection molding system specified is functional and safe.

In accordance with another aspect of the present invention, an automated injection molding configuring and manufacturing system includes a configuring subsystem for designing a custom designed injection molding system using a mix of customer defined parameters and manufacturer defined parameters. The system further includes a business subsystem and/or a processing subsystem in communication with the configuring subsystem.

The foregoing and other features and advantages of the method and apparatus for an automated injection molding configuring and manufacturing system will be apparent from the following more particular description of preferred embodiments of the method and apparatus as illustrated in the accompanying drawings.

BRIEF DESCRIPTION OF THE DRAWINGS

Preferred embodiments of the present inventions are described with reference to the following drawings, wherein:

FIGS. 17 and 18 are illustrations of computer screen displays of the manifold configuration selection process as offered by a particular embodiment of the configuring subsystem in accordance with the present invention;

FIG. 27 is an illustration of a computer screen display of the location ring selection process as offered by a particular embodiment of the configuring subsystem in accordance with the present invention;

FIG. 28 is an illustration of a computer screen display of the molding elevation selection process as offered by a particular embodiment of the configuring subsystem in accordance with the present invention;

FIG. 29 is an illustration of a computer screen display of the customer information form as offered by a particular embodiment of the configuring subsystem in accordance with the present invention;

FIG. 31 is an illustration of a computer screen display of the list of generated drawings offered by a particular embodiment of the configuring subsystem in accordance with the present invention;

DETAILED DESCRIPTION OF PREFERRED EMBODIMENTS

The present invention is directed to systems and methods for automating and integrating injection molding configuring and manufacturing systems.

The operating environment for the methods and apparatus for the injection molding configuring and manufacturing system of the present invention includes a processing system with at least one high speed processing unit and a memory system. In accordance with common practices in the art of computer programming, the description below includes reference to acts and symbolic representations of operations or instructions that are performed by the processing system, unless indicated otherwise. Such acts and operations or instructions are sometimes referred to as being "computer-executed" or "processing unit executed."

It will be appreciated that the acts and symbolically represented operations or instructions include the manipulation of electrical signals by the computer processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the processing unit. The computer readable medium includes cooperating or interconnected computer readable media, which exist exclusively on the processing system or is distributed among multiple interconnected processing systems that may be local or remote to the processing system.

The systems may be implemented using, but not limited to, the software and standards such as, for example, an IDEAS Master Series 7m2 running on Windows NT, SAP 4.6 running on Windows NT 4.0 (service pack 2), Microsoft Visual C++ (v5.0), and HTML version 3.0. However, it is possible to use other applications, languages, standards, and/or operating systems such as UNIX, LINUX or others.

Figure 1:
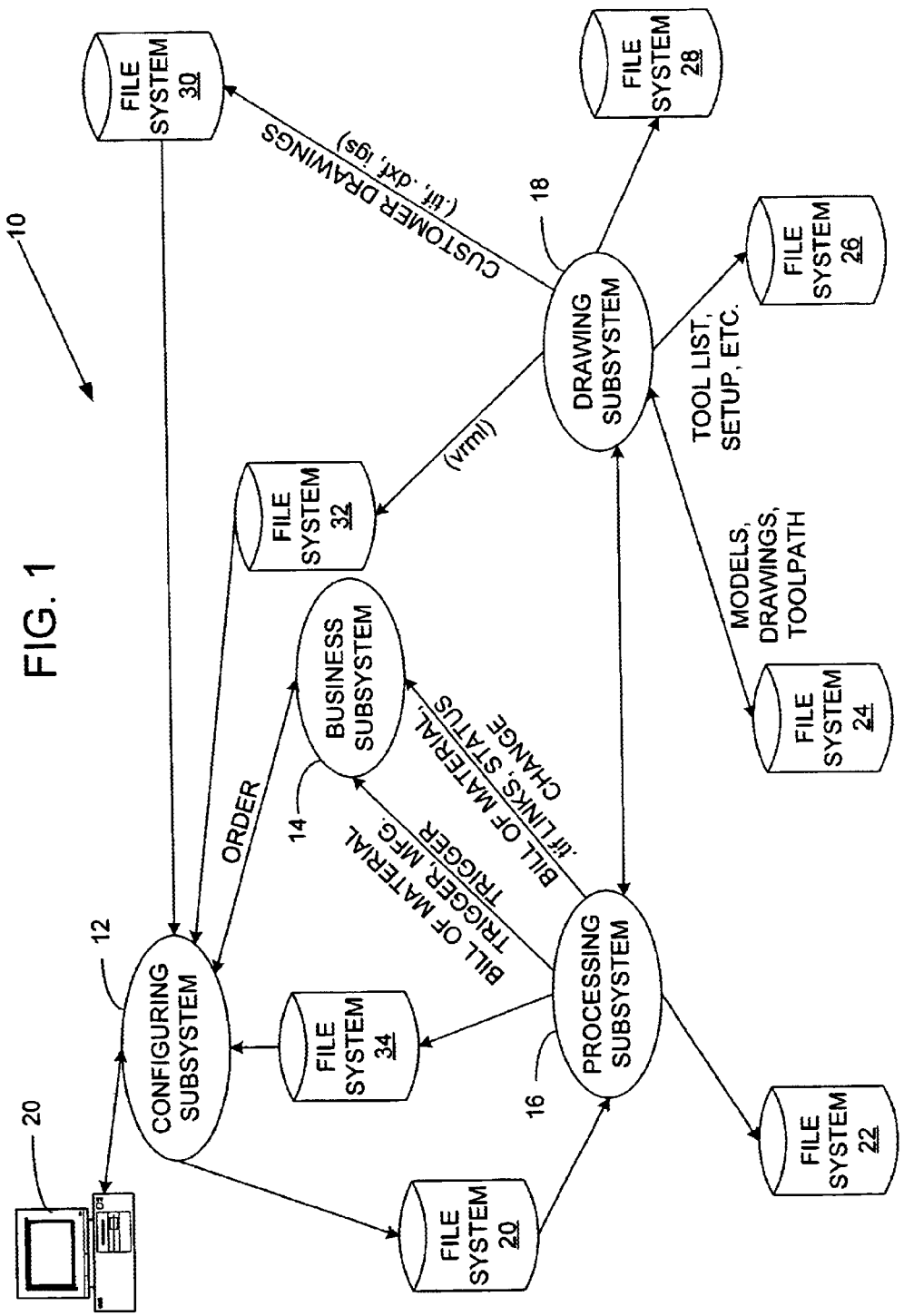
FIG. 1 is a diagram illustrating a preferred embodiment of the configuring and manufacturing system in accordance with the present invention.

FIG. 1 illustrates a preferred embodiment of the system 10 in accordance with the present invention which is used to configure and manufacture injection molding systems. The system 10 includes a configuring subsystem 12 which is a web-based, designing and ordering a configuration subsystem. A customer 20, can use the configuring subsystem 12 which is in communication with a web server using a browser application. The information present in the configuring subsystem 12 includes, but is not limited to, components, such as, locating rings, melt entries, manifolds, center locators, manifold cam locators, nozzle flanges, nozzles, actuators, and valves or pressure disks.

The configuring subsystem 12 receives a variety of inputs from the customer 20. These customer inputs include, but are not limited to, frame length, frame width, frame height, insulator plate, such as, for example, selecting between a "yes" or "no" option regarding the insulator plate, size, mold elevation, clamp slot details, water fitting type and size, leader pin size and position, guide pin size, screw size and position, clearance pockets size and position, mold foot, pry-slot and customer wire schematic and type of connector.

The system 10 includes a business subsystem 14 which processes the various bills and maintains cost and status information from the step of system quotation to the step of delivery of injection molding systems. In one particular embodiment, the business subsystem 14 is typical of a business transaction processing system. An example of the business subsystem 14 is the Enterprise Resource Planning (ERP) system, such as a SAP system.

The system 10 further includes a processing subsystem 16 which is a combination of custom software and general application software packages. It generates drawings based on the customer 20 input into the configuring subsystem 12.

The system 10 further includes a drawing subsystem 18 which generates two and three dimensional customer drawings and models. The drawing subsystem 18 also generates manufacturing tool lists and setup information.

Figure 2A:
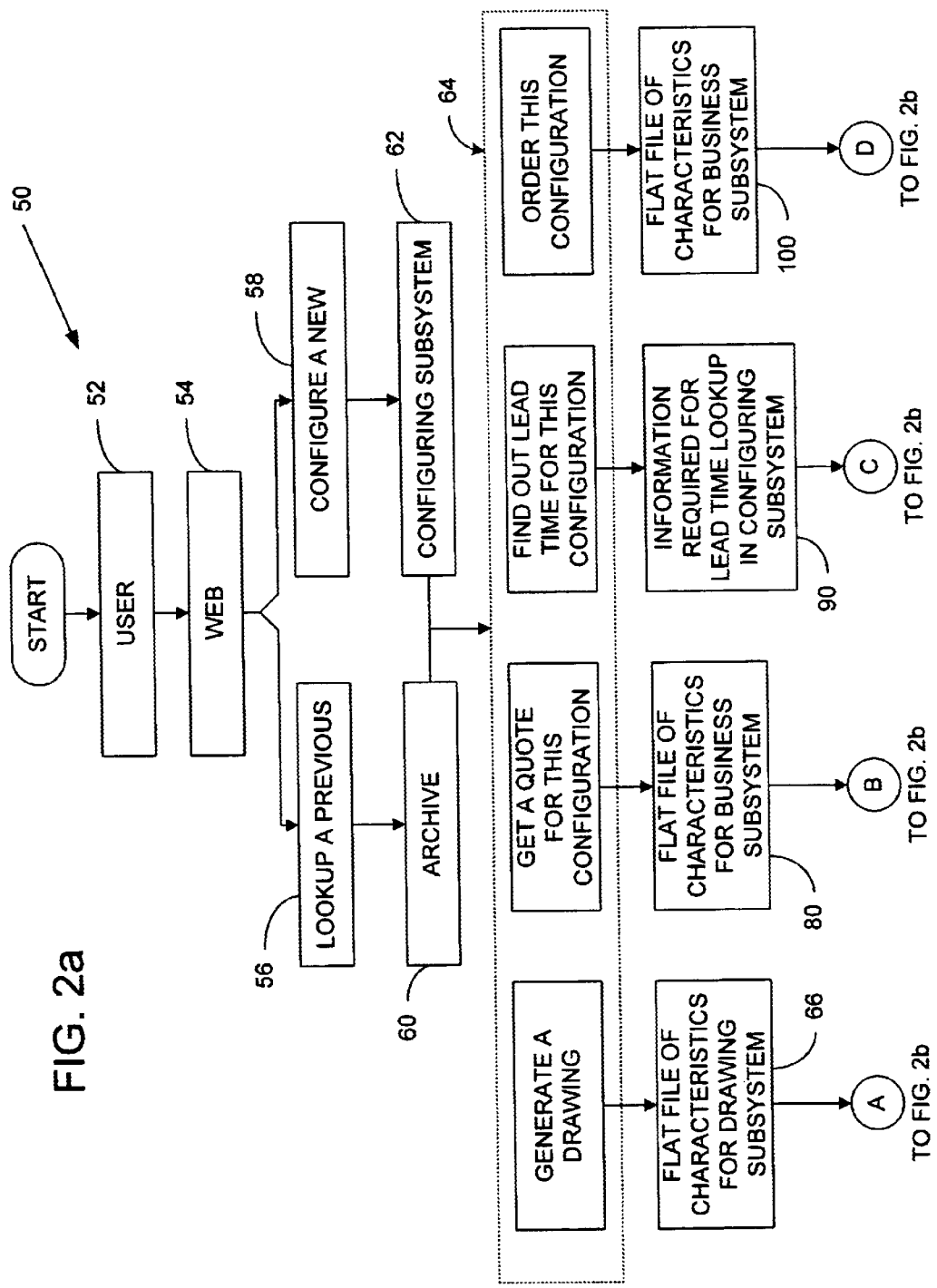
FIGS. 2a and 2b are flowcharts illustrating a preferred embodiment of the system in accordance with the present invention.
Figure 2B:
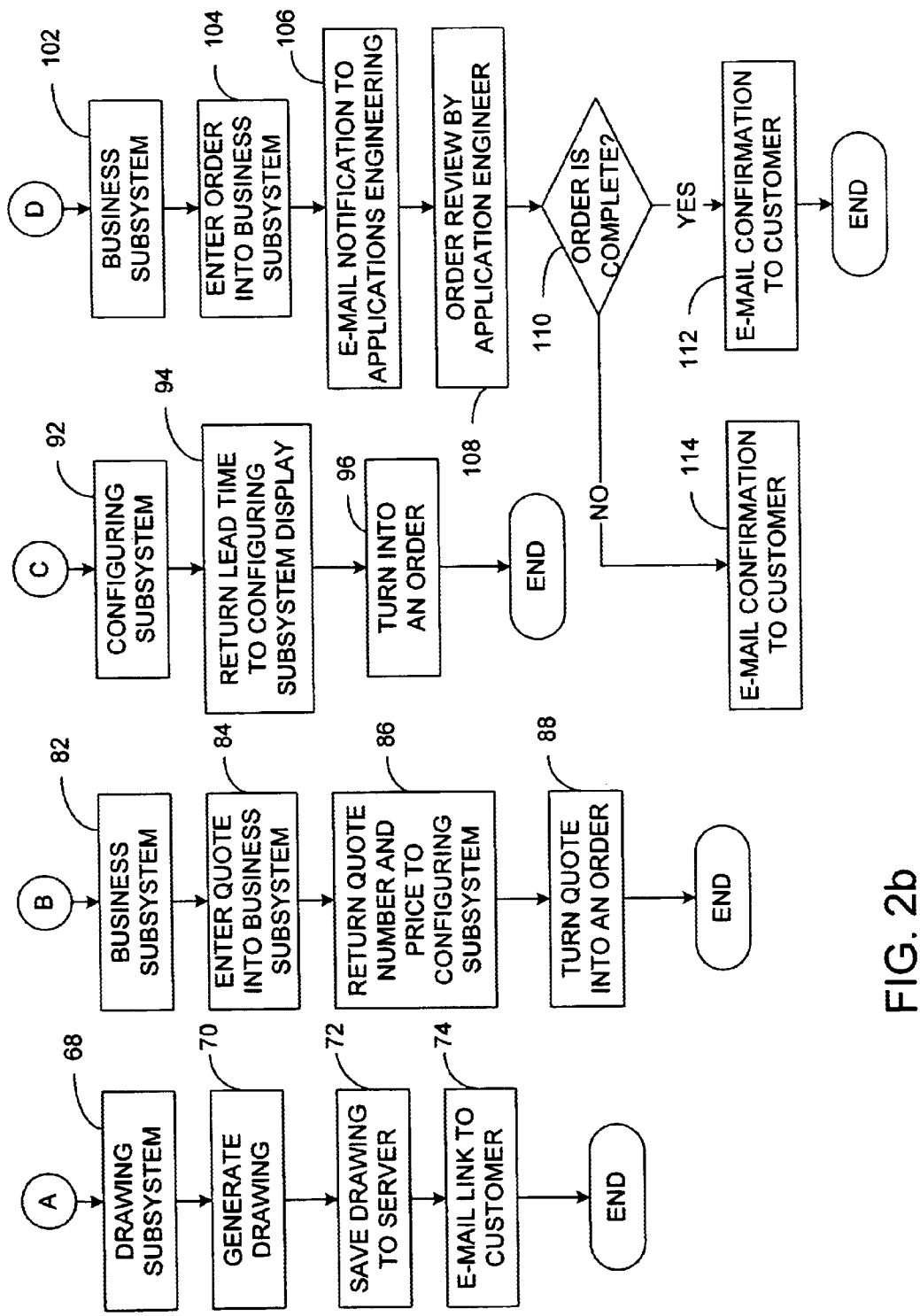

FIGS. 2a and 2b are flowcharts illustrating a preferred embodiment of the system in accordance with the present invention. The method beings at step 52 with a user or a customer logging into a digital network such as, the Internet or an Intranet. The Internet typically comprises a vast number of computers in computer network that are interconnected through communication links. The interconnected computers exchange information using various services, such as, electronic mail, and the world wide web ("WWW"). The WWW service allows a server computer system for example, a web server or a web site to send graphical web pages of information to a remote customer computer system 20. The remote customer computer system can then display web pages. Each resource for example, a computer or web page of the WWW is uniquely identifiable by a Uniform Resource Locator ("URL"). To view a specific web page, a customer computer system 20 specifies the URL for the web page in the request, for example, in a HyperText Transfer Protocol request. The request is forwarded to the web server that supports that web page. When that web server receives the request, it sends that web page to the customer computer system 20. When the customer computer system receives that web page, it typically displays that web page using a browser. A browser is a special purpose application program that effects the requesting and the displaying of web pages. Any WWW browser on any personal computer platform, such as, but not limited to, MacIntosh, Windows 95, Windows NT, and DOS, may be used.

Web pages are typically defined using HyperText Markup Language ("HTML"). HTML provides a standard set of texts that define how a web page is to be displayed. When a user instructs the browser to display a web page, the browser sends a request to the server computer system to transfer to the customer computer system the HTML document that defines the web page. When the requested HTML document is received by the customer computer system, the browser displays the web page as defined by the HTML document. The HTML document contains various texts that control the displaying of texts, graphics, control and other features.

The WWW is specially conducive to conducting electronic commerce. The web server computer system may provide an electronic version of a catalog that lists the items that are available. Thus the user at step 52 logs in to the WWW at step 54. Once the user has gained access into the system, the user is offered two options. The first being at step 56, the user is given an option to look up a previous configuration. In the second option at step 58, the user can choose the option of configuring a new injection molding system. At step 62, once the user has opted to configure a new system, the user accesses the configuring subsystem 12. The configuring subsystem 12 then interacts with the other subsystems in system 10 such as, the processing subsystem 16 and the business subsystem 14 as described with respect to FIG. 1. At step 64, the user then chooses if they want to generate a drawing for their system that was just configured or get a cost or a quote for the configuration that they specified, or they can get schedule information and order the configuration they just defined. The same option at step 64 is also available to a user who had chosen to look up a previous configuration at step 56 which in turn accesses an archive database 60.

If the user decides to generate a drawing of the configured injection molding system at step 64, then a file of characteristics or processed customer inputs are accessed per step 66 for the drawing subsystem 18. The resulting characteristics are sent to the drawing subsystem at step 68. The drawing subsystem 18 then generates the drawings at step 70. The drawings are saved to a file system in the server, per step 74. The customer then gains access to the generated drawings using, but not limited to, an electronic mail link that is provided to the customer per step 74.

If at step 64 the customer or user had determined to get a quote or a cost estimate for the configured system, then a file of characteristics is accessed for the business subsystem at step 80. The file of characteristics is sent to the business subsystem 14 at step 82. The business subsystem 14 then processes the processed inputs or characteristics and enters a quote into the system at step 84. At step 86, the quote containing the quantities and prices may then be displayed to the customer in the configuring subsystem 12. The customer at this point can choose to effectuate an order based on the return quote at step 88.

If the customer had chosen to determine the lead time and schedule for the configured system at step 64, then the information required to determine the schedule information is accessed at step 90. The quote information is sent to the configuring subsystem 12 at step 92 which processes the information and returns a schedule and lead time to a configuring subsystem 12 which can be viewed by the customer. At step 96, this particular schedule can be implemented into an order by the customer. Upon configuring the system using the configuring subsystem 12, the user can use step 64 to directly order the configuration without the need to generate drawings or get a quote or schedule information for the configuration. At step 100, the file of characteristics is accessed for the business subsystem 14. These characteristics are sent to the business subsystem 14 at step 102. The business subsystem at step 104 processes the order. At step 106, an electronic mail notification is sent to the verifying personnel, such as an application engineer. At step 108, the verifying personnel reviews the configured system to verify the functionality, safety, manufacturability and applicability of the customized design. Once positively reviewed, the order is completed at step 110, and an electronic mail confirmation is sent to the customer at step 112. If the review is not favorable, then per step 114, an electronic mail request for further information or alterations is sent to the customer to ensure a design that is manufacturable, functional, and safe.

Figure 3:
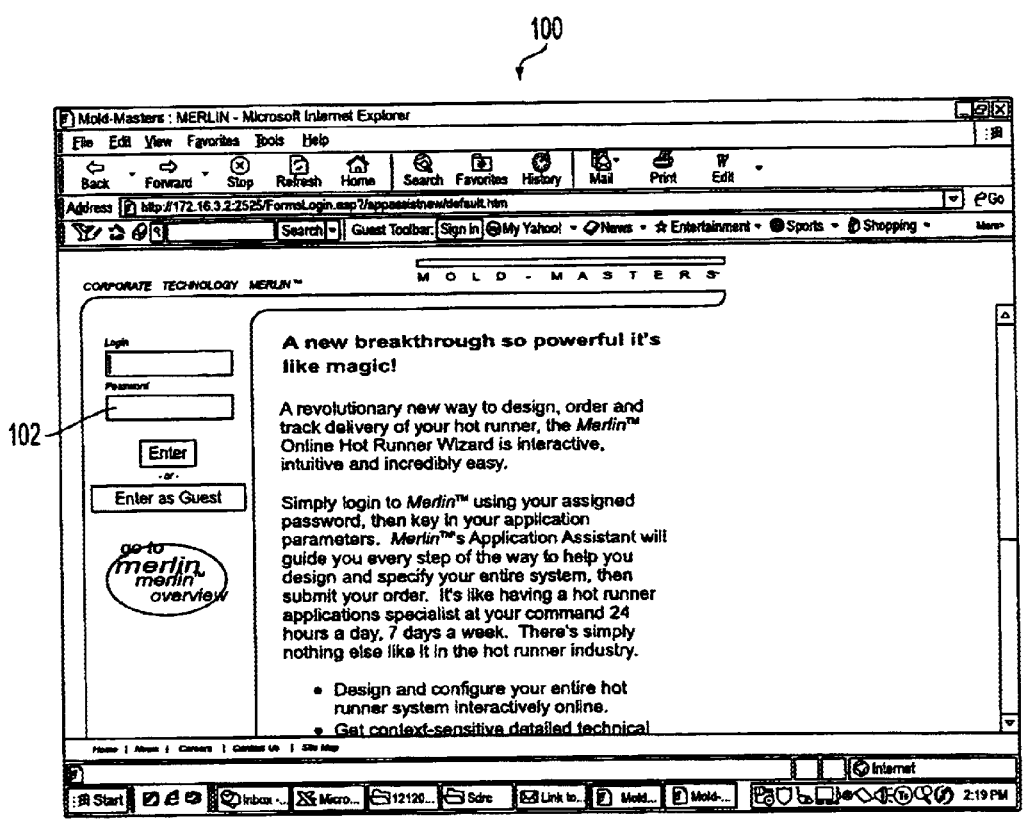
FIG. 3 is an illustration of a computer screen display showing the login entry process into the configuring subsystem in accordance with a particular embodiment of the present invention.

FIG. 3 is an illustration of a computer screen display 100 showing the login entry process into the configuring subsystem in accordance with one particular embodiment of the present invention. The configuring subsystem 12 is password protected in the interest of security, as indicated by the login menu in the password entry area 102 shown in the computer screen display 100. The "security" of the system could be provided through any of the many techniques known in that field. The configuring subsystem 12 provides the ability for a customer to custom design, order and track the delivery of injection molding systems. The configuring subsystem 12 is an interactive expert system which is intuitive and easy to use by a customer.

Figure 4:
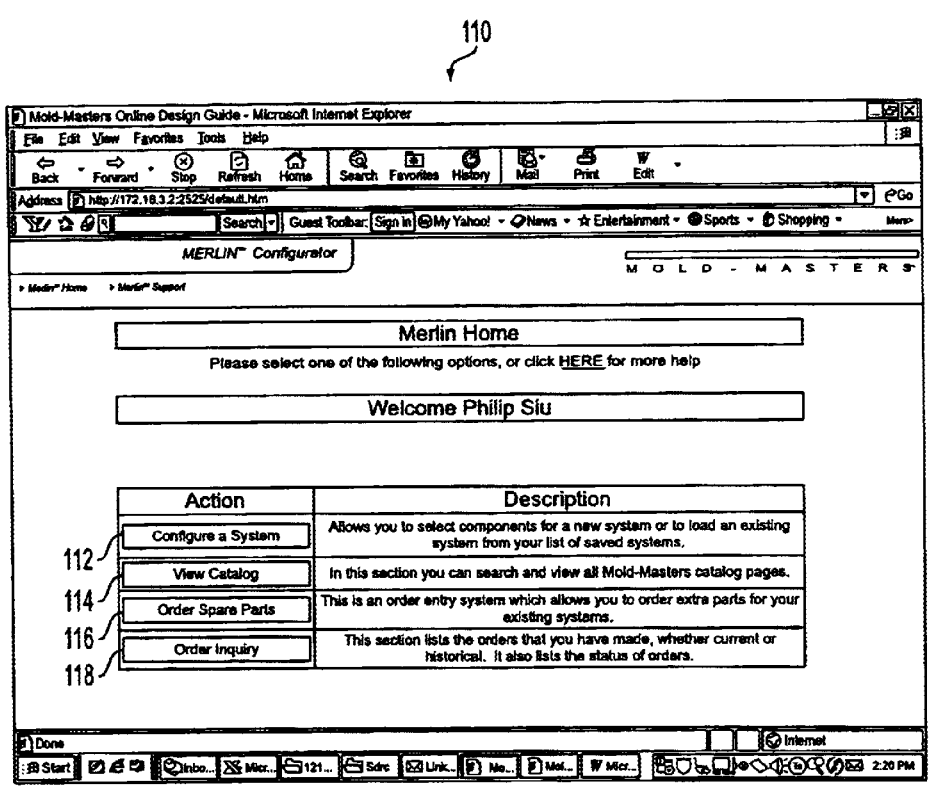
FIG. 4 is an illustration of a computer screen display of the options offered by a particular embodiment of the configuring subsystem in accordance with the present invention.

FIG. 4 is an illustration of a computer screen display 110 of the options offered by a particular embodiment of the configuring subsystem in accordance with the present invention. The configuring subsystem 12 has four options offered to the customer 20, once they have accessed the system after going through the security measures of logging in as described with respect to FIG. 3. The computer screen display 110 illustrates the four options, one being the option to configure a system 112, the second being the option to view a catalog 114, the third being the option to order spare parts 116 and the fourth being the option to perform an order inquiry 118. The "configure a system" 112 option allows the customer to select components to either configure a new system or access an existing system from previously saved systems. The option of viewing a catalog 14 allows a customer a view electronic versions of component catalog or system catalog pages. The option to order spare parts 116 is an order entry system which allows the customer to order extra parts for existing systems. The option of order inquiry 118 allows a customer to view orders that were previously entered or view a listing of current orders. In addition, the order inquiry option 118 lists the status of orders.

Figure 5:
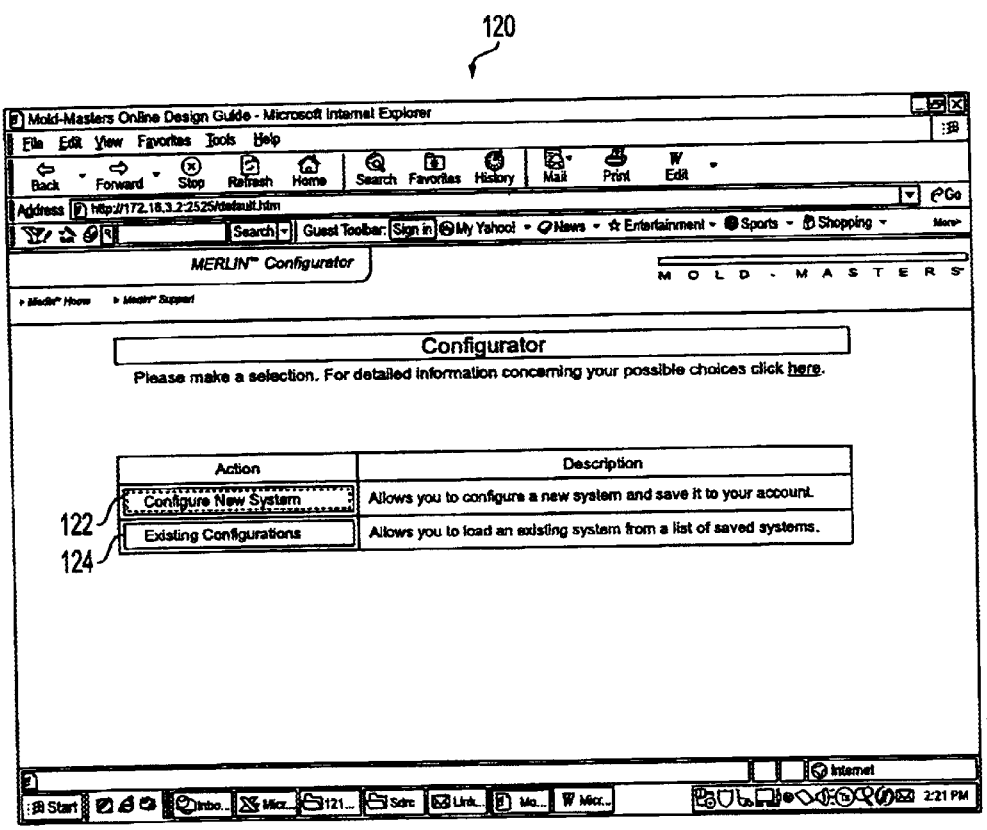
FIG. 5 is an illustration of a computer screen display of the configuring options offered by a particular embodiment of the configuring subsystem in accordance with the present invention.

FIG. 5 is an illustration of a computer screen display 120 of configuring options offered by a particular embodiment of the configuring subsystem 12 in accordance with the present invention. The computer screen 120 illustrates the selection options under the "configure a system" option 112. The customer is asked to make a selection between a "configure a new system" option 122, or an "existing configurations" option 124. The "configure a new system" option 122 allows the customer to configure a system and save it to their account. The existing configurations system option 124 allows the customer to access an existing system from the list of saved systems.

Figure 6:
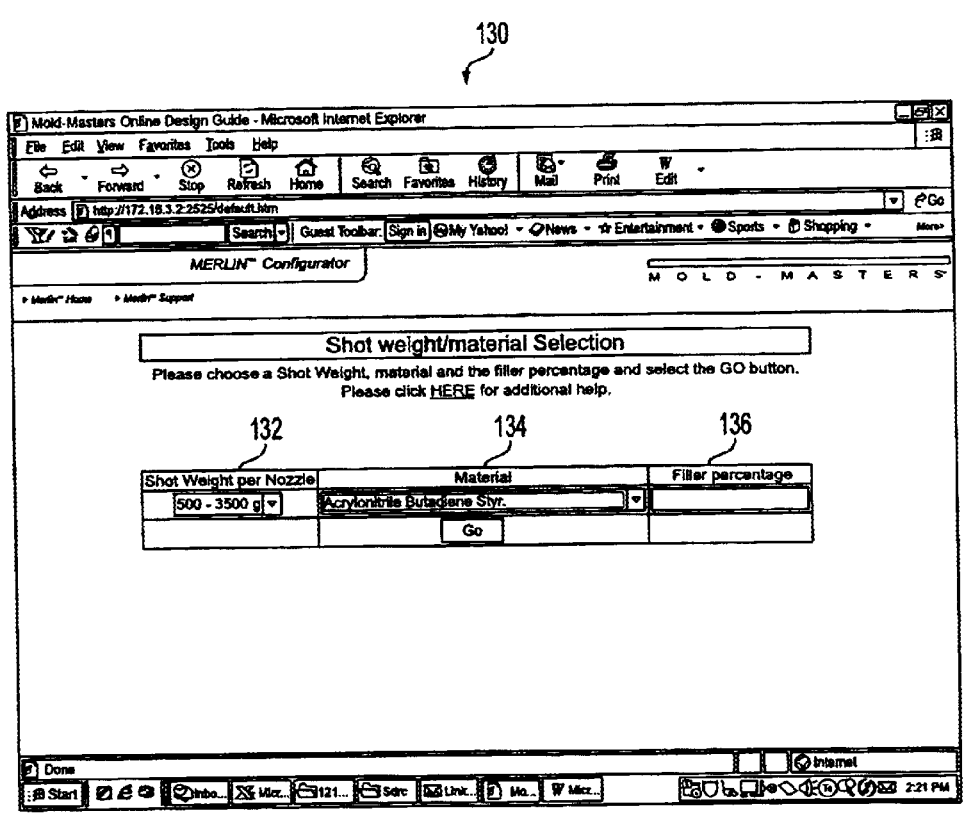
FIG. 6 is an illustration of a computer screen display of the customer inputs relating to material weight and selection in accordance with a particular embodiment of the present invention.

FIG. 6 is an illustration of a computer screen display 130 of the customer inputs relating to material weight and selection in accordance with the present invention. Once the "configure a new system" option 122 has been chosen as discussed with respect to FIG. 5, the customer is then asked to input a shot weight, material, and fill up percentages information into a user input display. The shot weight, material and fill up percentages can be selected from pull down menus that are available. Another option, in this computer screen display 130 is that the shot weight 132, material 134, and fill up percentages 136 can be manually entered in the respective input graphical selection inputs.

Figure 7:
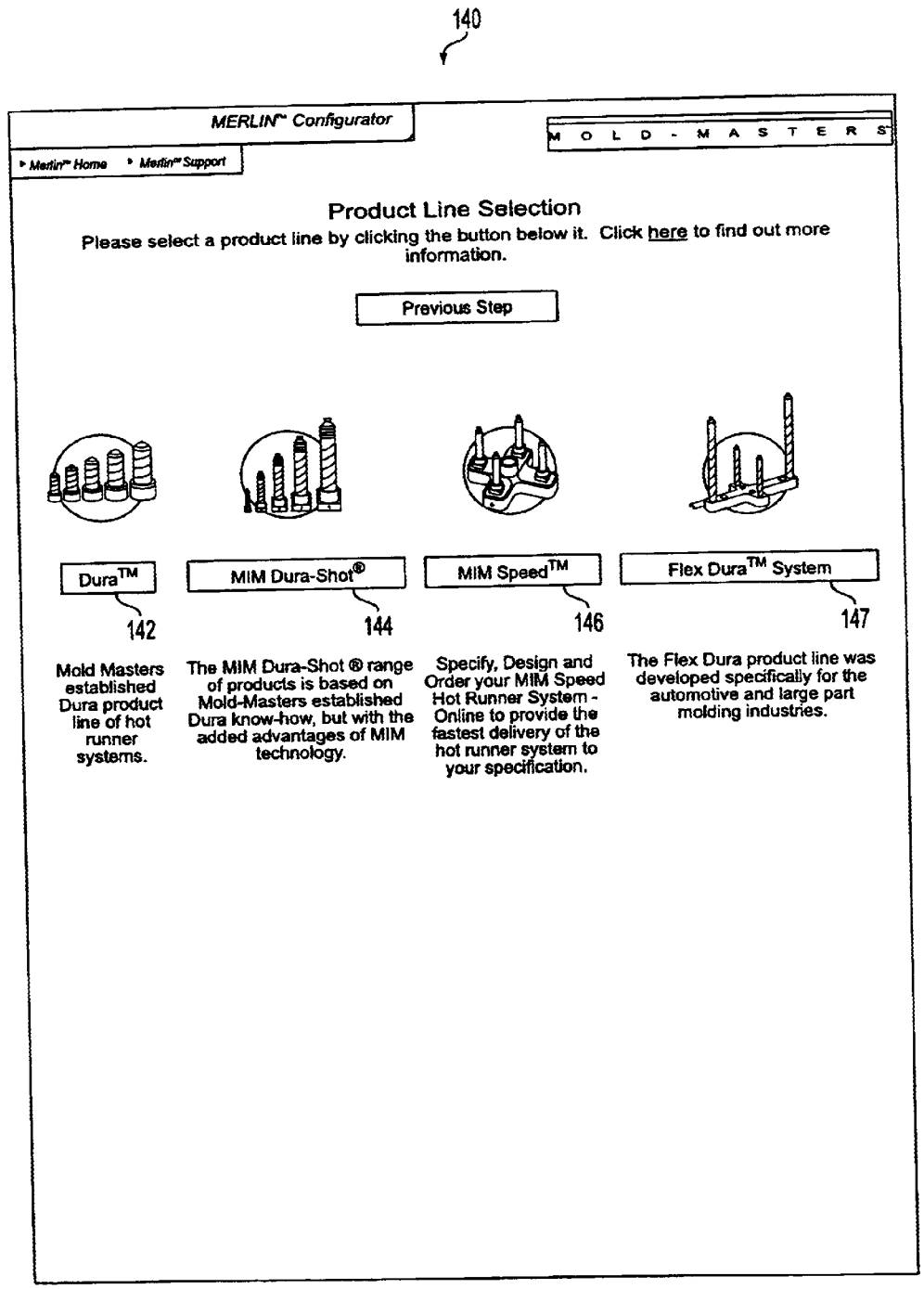
FIG. 7 is an illustration of a computer screen display of the product line options offered by a particular embodiment of the configuring subsystem in accordance with the present invention.

FIG. 7 is an illustration of a computer screen display 140 of the product line options offered by a particular embodiment of the configuring subsystem 12 in accordance with the present invention. The customer is prompted as shown on screen 140 to select a product line that is provided by the manufacturer by clicking on a corresponding button placed below the options, such as, the graphical selection input 142 for Dura™, the MIM Dura-Shot® graphical selection input 144, the graphical selection input 146 for MIM Speed™, or the Flex Dura™ System graphical selection input 147. There is a brief description pertaining to each of the four product lines. Although the screen display 140 shows four product lines, the present invention is not limited to just the four product lines. The trademarks and products shown here for illustration are obtained from Mold-Masters Limited, of Georgetown, Ontario, Canada. Different manufacturers would be expected to supply their own information. More or fewer product lines can be offered to a customer.

Figure 8:
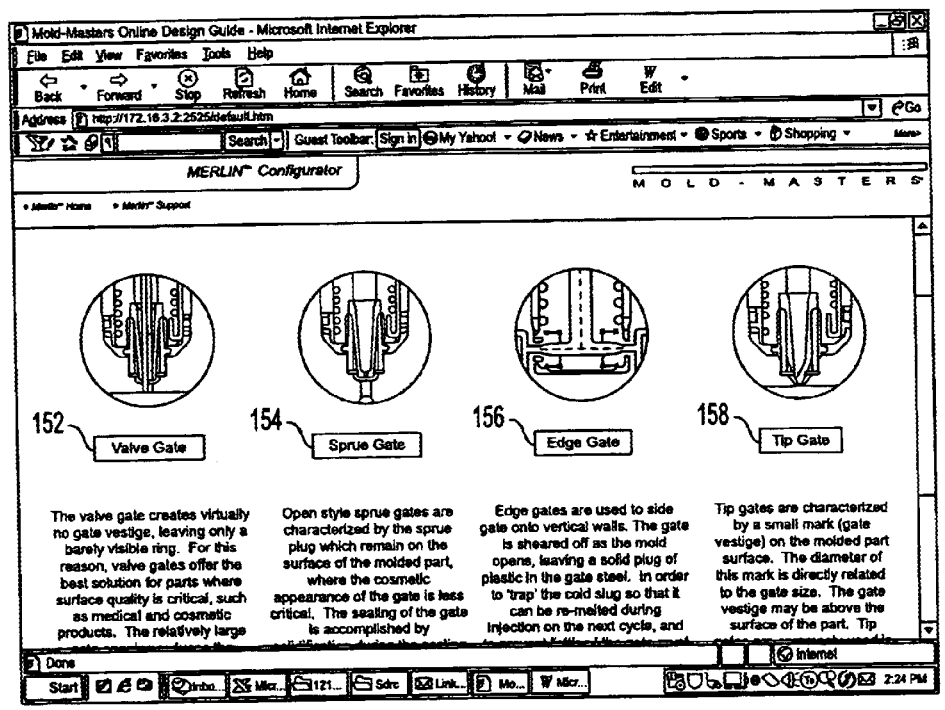
FIG. 8 is an illustration of a computer screen display of the gating options offered by a particular embodiment of the configuring subsystem in accordance with the present invention.

FIG. 8 is an illustration of a computer screen display 150 of the gating options offered by a particular embodiment of the configuring subsystem 12 in accordance with the present invention. The computer screen display 150 is the next sequential screen after the computer screen 140 described with respect to FIG. 7. The customer 20 is queried to choose between the different gating technologies that they would like to use. The options that are presented in the example illustrated include a valve gate 152, a sprue gate 154, an edge gate 156, and a tip gate 158. The customer is provided with information regarding all the gating technologies provided. Although there are four gating technologies described herein, the screen 150 can include fewer or more gating technologies.

Figure 9:
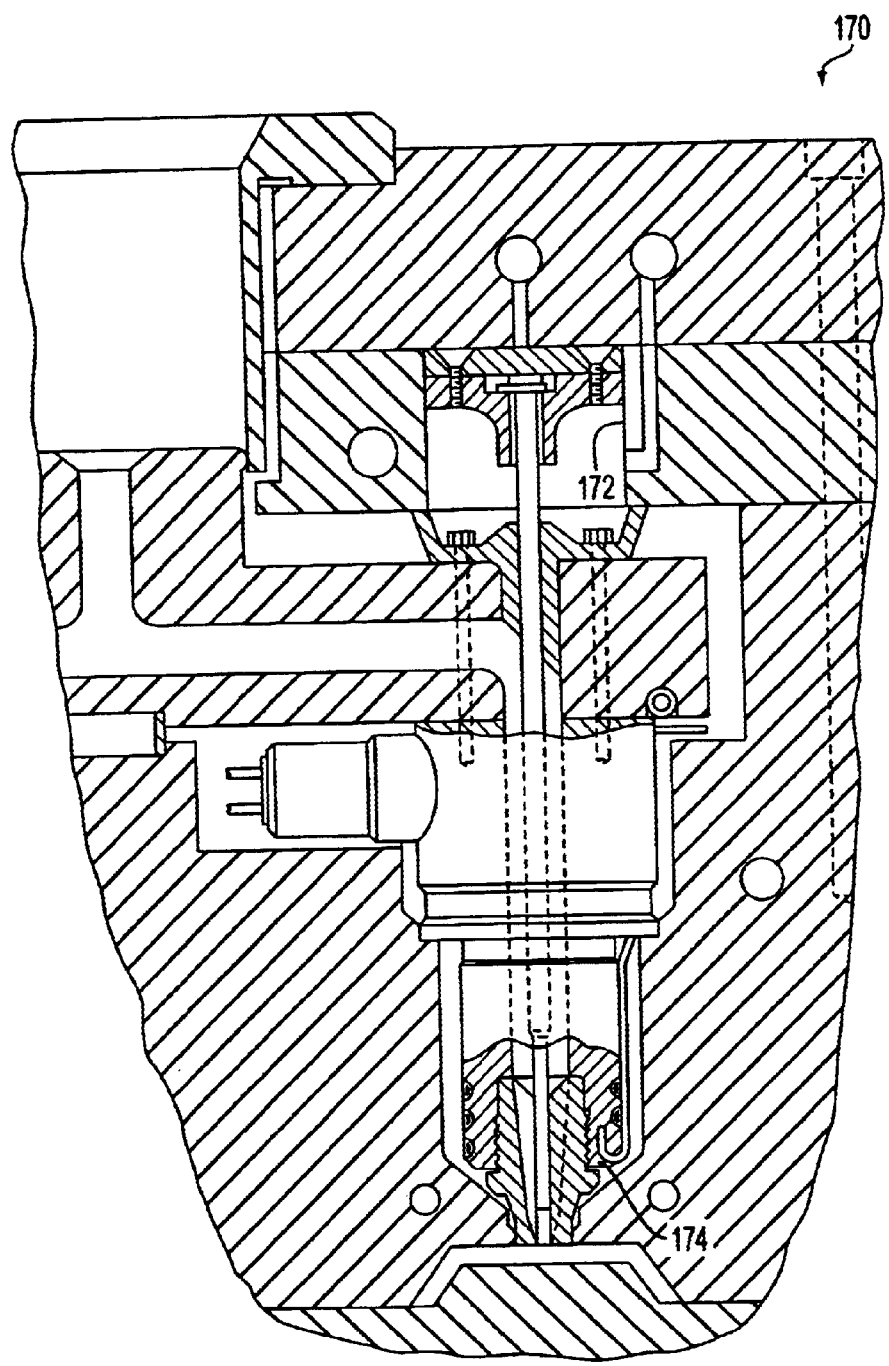
FIG. 9 is sectional view of a portion of a multi-cavity valve gated injection molding system showing a one-piece gate and locating insert according to one electronic catalog page offered by a particular embodiment of the configuring subsystem of the present invention.

FIG. 9 is sectional view of a portion of a multi-cavity valve gated injection molding system 170 showing a one-piece gate and locating insert according to one electronic catalog page offered by a particular embodiment of the configuring subsystem 12 in accordance with the present invention. The injection molding system 170 of this example is described in a U.S. Pat. No. 5,849,343, which issued on Dec. 15, 1998, and is incorporated herein by reference. The customer can make changes to many different dimensions of the multi-cavity valve gated injection molding system 170 such as, for example, to the dimensions of the cylinder 172 and to the area of the nozzle 174.

Figure 10:
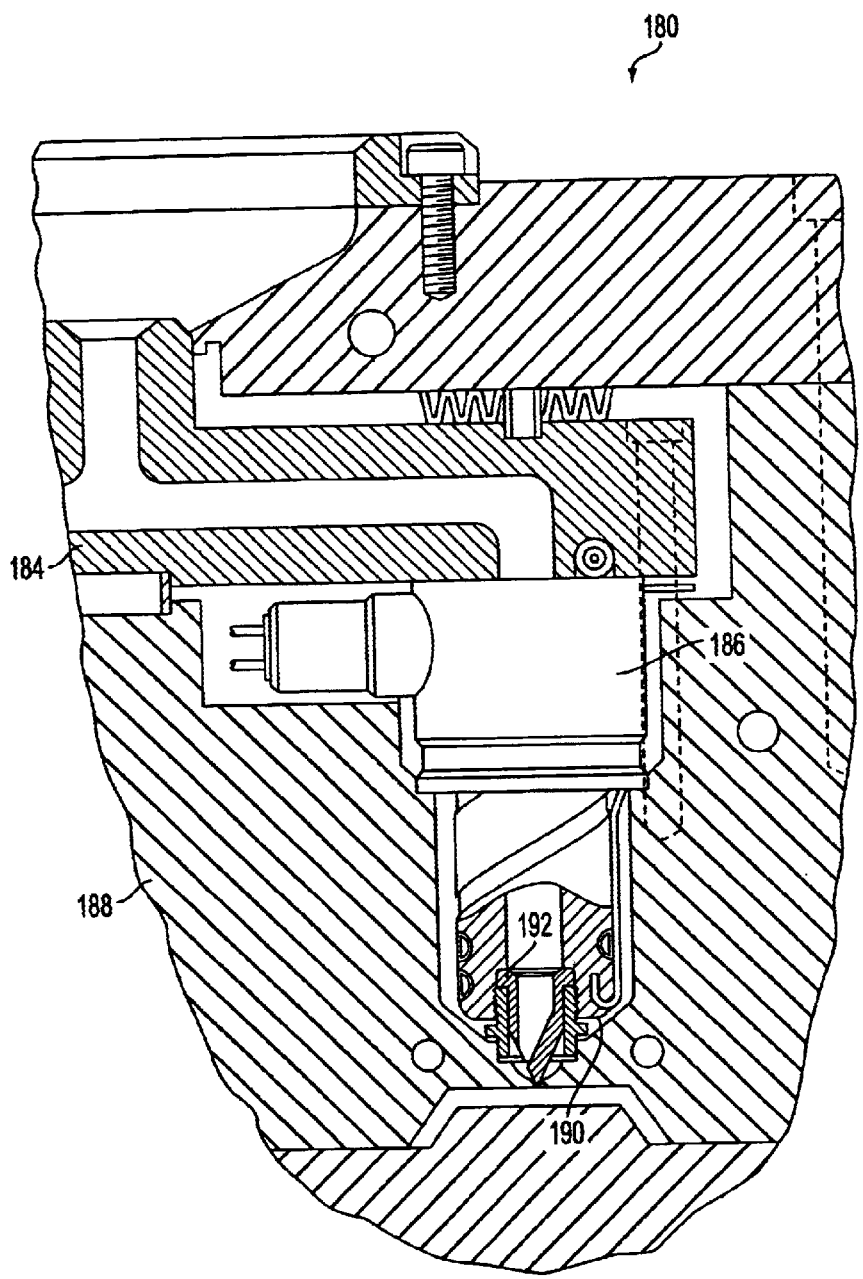
FIG. 10 is a sectional view of a portion of a multi-gate injection molding system showing a torpedo according to one electronic catalog page offered by a particular embodiment of the configuring subsystem in accordance with the present invention.

FIG. 10 is a sectional view of a portion of an illustrative multi-gate injection molding system 180 including a torpedo 192, according to one electronic catalog page offered by a particular embodiment of the configuring subsystem 12 in accordance with the present invention. The injection molding system 180 of this example is described in a U.S. Pat. No. 5,658,604, which issued on Aug. 19, 1997, and is incorporated herein by reference. The system 180 has a melt distribution manifold 184 interconnecting several heated nozzles 186 in a mold 188. The customer can change several dimensions, such as, for example, the dimension of the front end 190 of each nozzle 186 as well as the dimensions of the torpedo 192.

Figure 11:
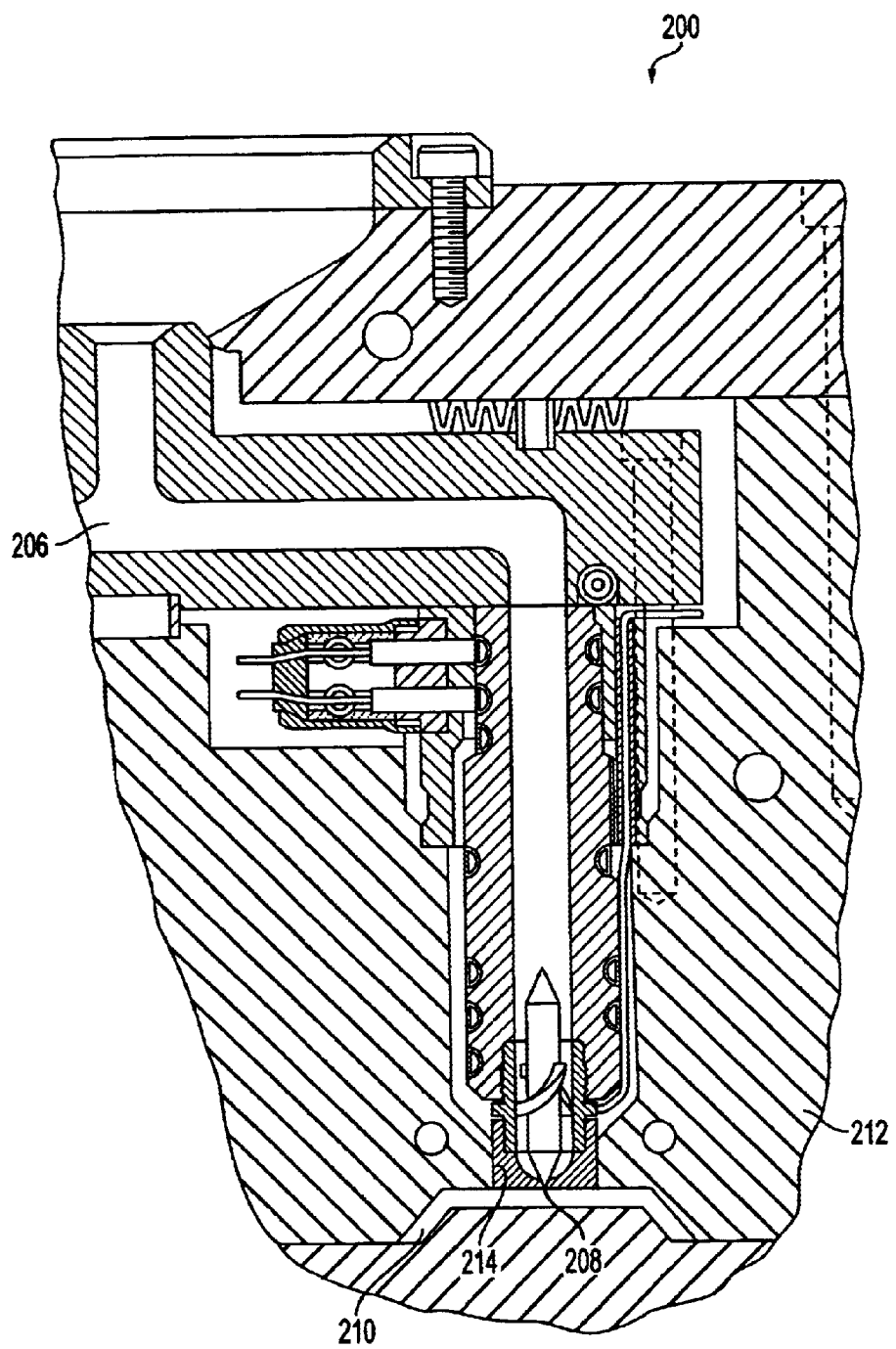
FIG. 11 is a partial sectional view of a portion of a multi-cavity injection molding system according to one electronic catalog page in accordance with a particular embodiment of the present invention.

FIG. 11 is a partial sectional view of a portion of an illustrative multi-cavity injection molding system 200 according to one electronic catalog page in accordance with the present invention. The injection molding system 200 of this example is described in a U.S. Pat. No. 5,421,716, which issued on Jun. 6, 1995, and is incorporated herein by reference. The multi-cavity injection molding system 200 has several steel nozzles to convey pressurized plastic melt through melt passage 206 to respective gates 208 leading to a different cavity 210 in the mold 212. The customer can change and configure the system by defining their own dimensions such as, for example, defining the dimensions for the cylindrical opening 214.

Figure 12:
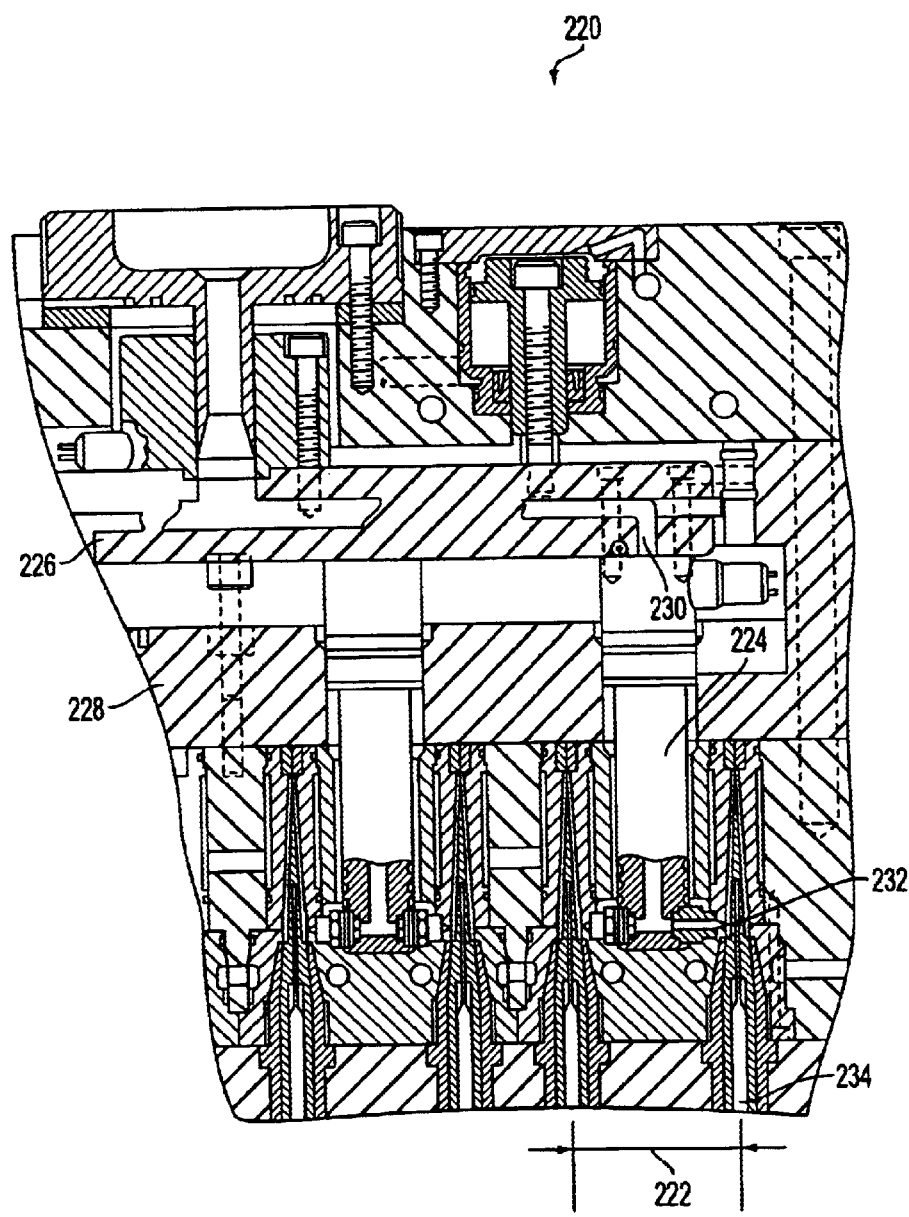
FIG. 12 is a sectional view of a portion of a side gated molding system in the closed position according to one electronic catalog page in accordance with a particular embodiment of the present invention.

FIG. 12 is a sectional view of a portion of an illustrative side gated molding system 220 in the closed position according to one electronic catalog page in accordance with the present invention. The injection molding system 220 of this example is described in a U.S. Pat. No. 5,952,016, which issued on Sep. 14, 1999, and is incorporated herein by reference. The multi-cavity injection molding system 220 has several heated steel nozzles 224 extending from a heated steel melt distribution manifold 226 in a mold 228 to convey pressurized melt to the melt passage 230 to several gates 232 spaced around each heat nozzle 224. The customer can change the dimensions such as, the length 222 between the central cooling conduits 234.

Figure 13:
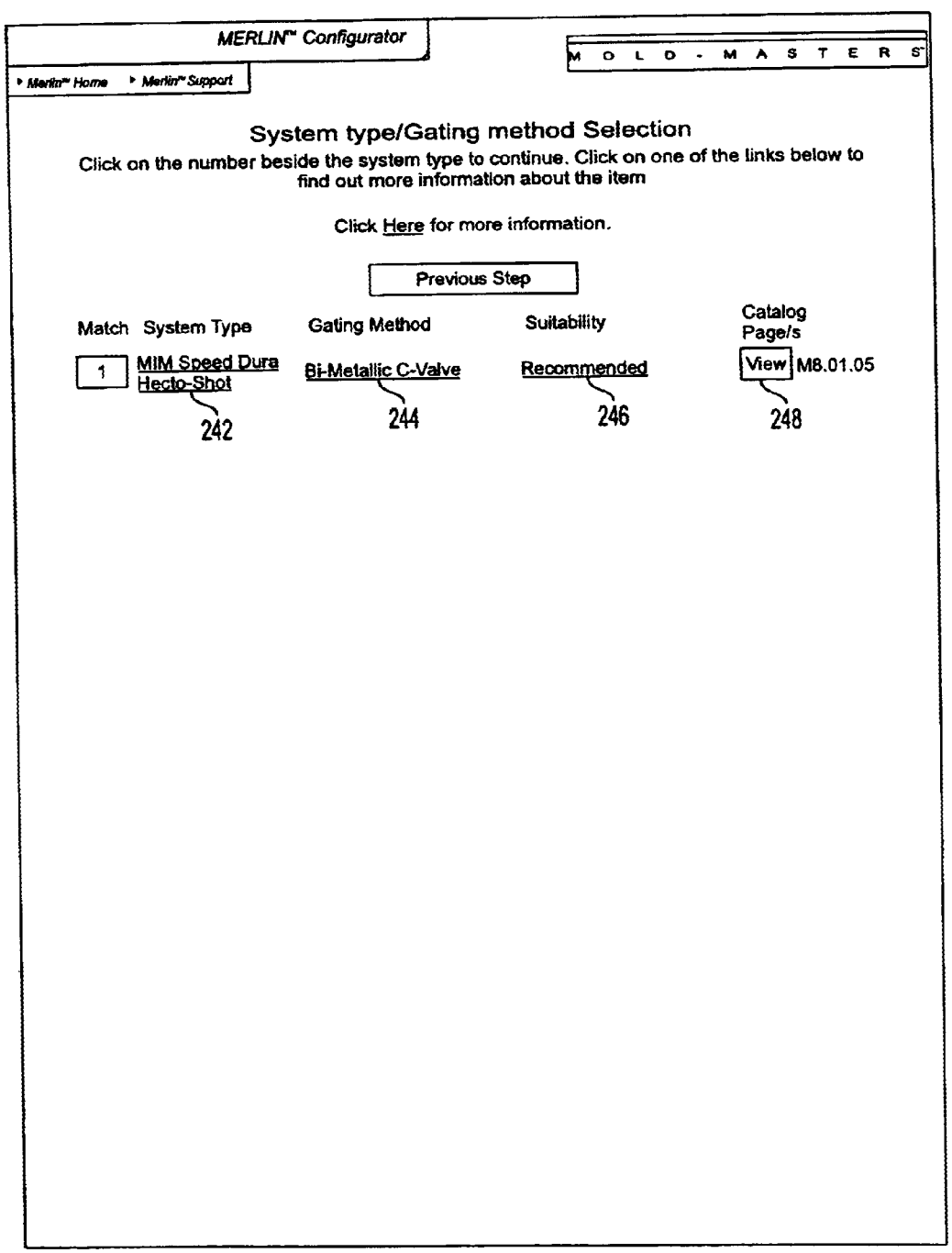
FIG. 13 is an illustration of a computer screen display of the system type and gating method selection as displayed by a particular embodiment of the configuring subsystem in accordance with the present invention.

FIG. 13 is an illustration of a computer screen display 240 of the system type and gating method selection as displayed by a particular embodiment of the configuring subsystem 12 in accordance with the present invention. This computer screen display 240 itemizes the system type chosen, such as the MIM Speed Dura Hecto—Shot system 242, and the gating method selected, such as the Bi-Metallic C-Value 244. It further provides recommendations for further options if the configured design chosen up to this point, such as the system type and gating methodology, is suitable for the functional system as shown in the graphical selection input 246. In addition, the screen provides visibility into the electronic versions of the catalog pages as viewed by clicking on the graphical selection input "view" 248.

Figure 14:
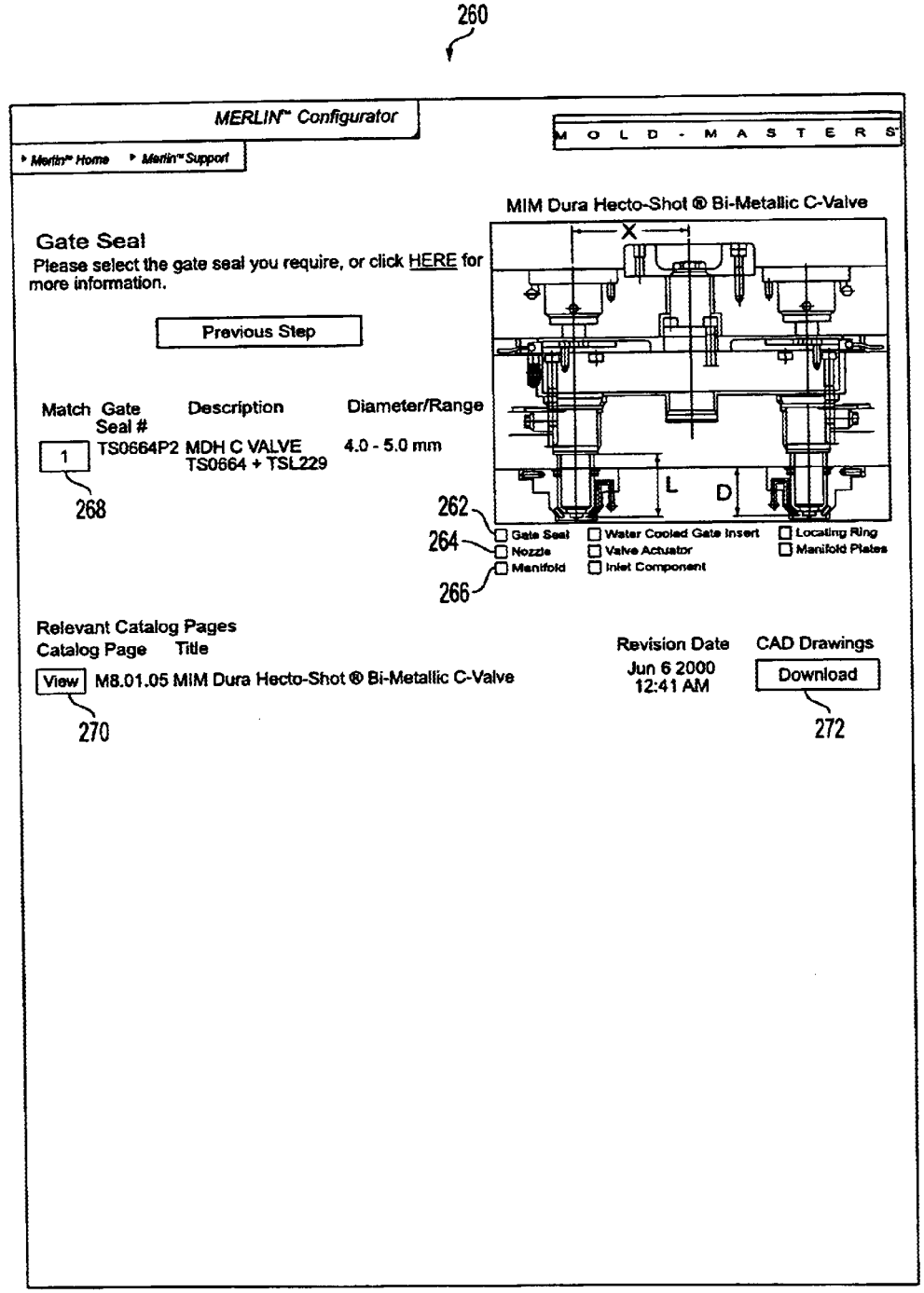
FIG. 14 is an illustration of a computer screen display of the gate seal selection process as offered by a particular embodiment of the configuring subsystem in accordance with the present invention.

FIG. 14 is an illustration of a computer screen display 260 of the gate seal selection process as offered by a particular embodiment of the configuring subsystem 12 in accordance with the present invention. As displayed in right hand side of the screen, the customer is asked to choose several components and system elements, such as the gate seal 262, a nozzle 264, a manifold 266, and so on. In this exemplary embodiment, the first component that the customer can specify once the system type and gating methodology has been selected previously is the gate seal 262. The customer is prompted to get more information from the electronic version of the catalog, or to provide her own specification, or to select the gate seal provided by the configuring subsystem in the match graphical selection input 268. The gate seal number with the appropriate descriptions such as, diameters and ranges are displayed for the match graphical selection input 268 configuring subsystem selection. Further, catalog pages of the gate seal selected by the configuring subsystem 12 can be viewed by clicking on the graphical selection input 270 along with the option of accessing computer-aided design (CAD) drawings by clicking on the graphical selection input 272.

Figure 15:
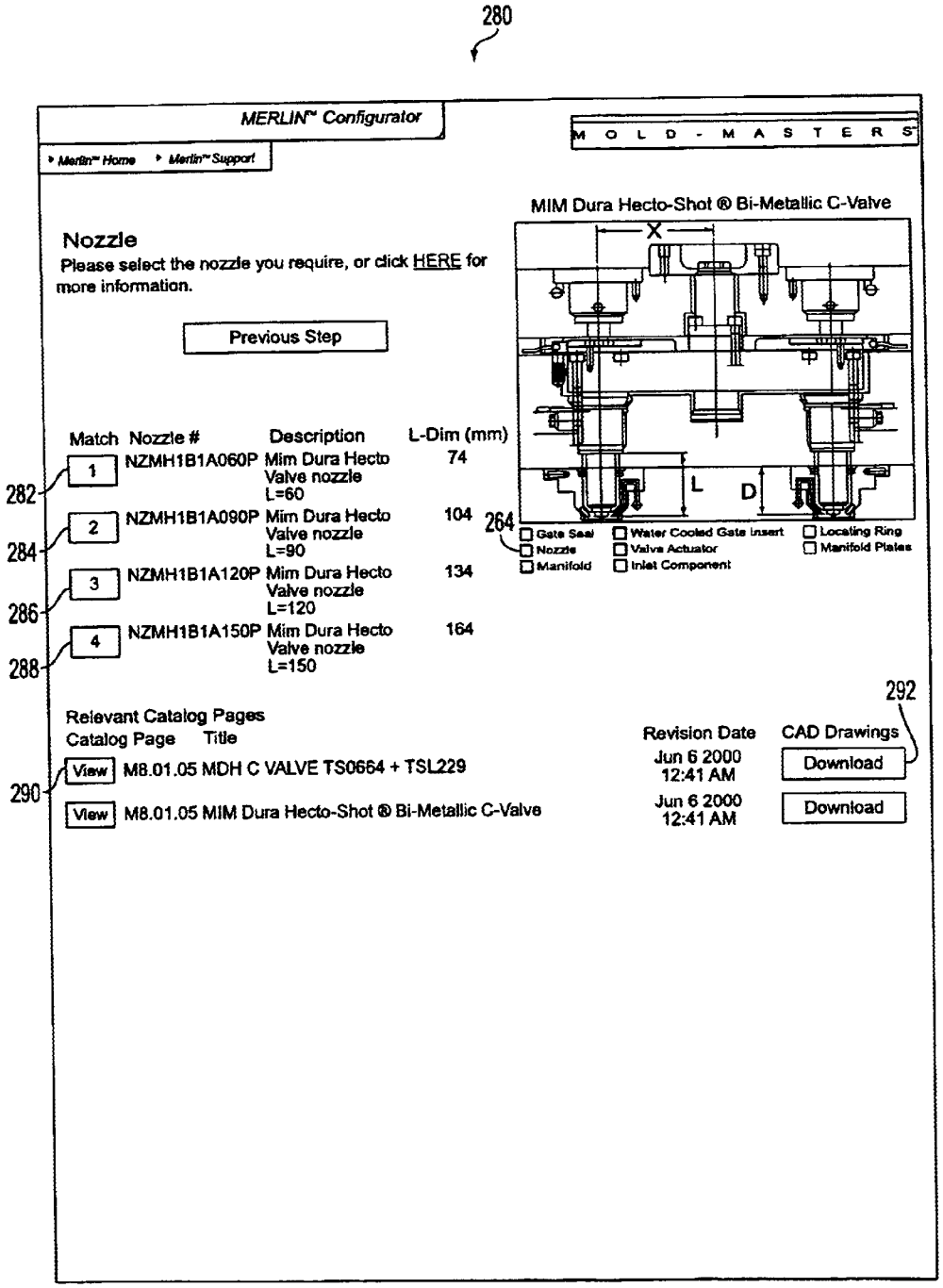
FIG. 15 is an illustration of a computer screen display of the nozzle selection process as offered by a particular embodiment of the configuring subsystem in accordance with the present invention.

FIG. 15 is an illustration of a computer screen display 280 of the nozzle selection process as offered by a particular embodiment of the configuring subsystem 12 in accordance with the present invention. The next component, once the gate seal 262 has been chosen, is typically the nozzle component 264. Once again the customer can provide the dimensions for a nozzle or select dimensions of matches that the configuring subsystem 12 returns based on the selected system and gating technology. In this example, four matches 282, 284, 286, and 288 have been returned as possible nozzle selections for the customer selected system and gating technology. The relevant catalog pages can be viewed by clicking on the graphical selection input 290 and corresponding drawings can be downloaded by the customer by clicking on the download graphical selection input 292.

Figure 16:
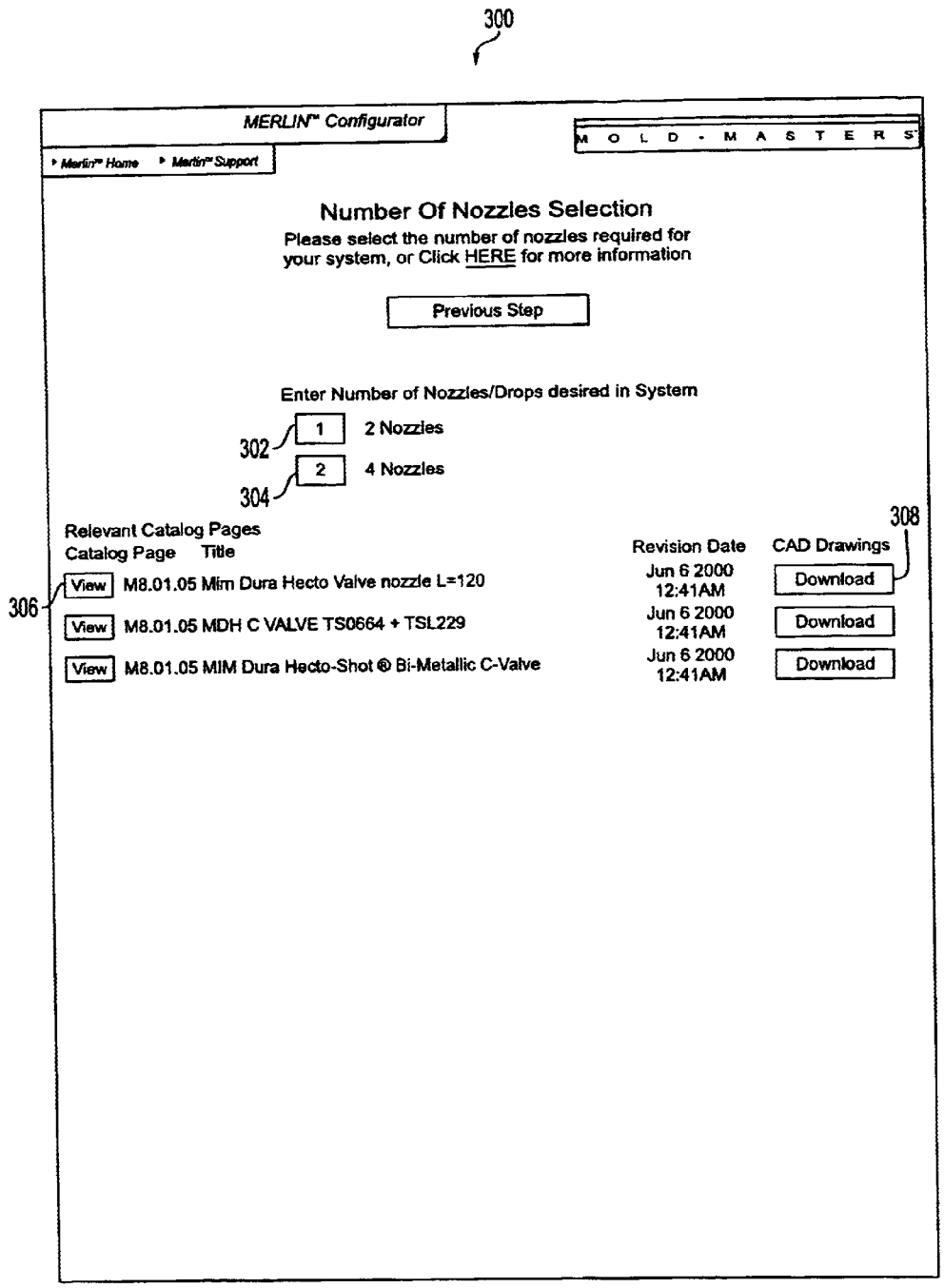
FIG. 16 is an illustration of a computer screen display of the nozzle quantity selection process as offered by a particular embodiment of the configuring subsystem in accordance with the present invention.

FIG. 16 is an illustration of a computer screen display 300 of the nozzle quantity selection process as offered by a particular embodiment of the configuring subsystem 12 in accordance with the present invention. The computer screen display 300 is the next logical step in configuring the system per a customer specified parameter. Once the nozzles have been chosen as described with respect to FIG. 15, the number of nozzle selection occurs. The customer can input his selection or take guidance from the recommendation of the configuring subsystem 12. The configuring subsystem 12 for this particular example has returned a choice of two nozzles 302 or four nozzles 304. Catalog pages which are the electronic versions of the manufacturer's catalogs can be viewed by clicking on a graphical selection input, such as graphical selection input 306, and similarly CAD drawings for each of the corresponding nozzles can be downloaded by clicking the graphical selection input download 308.

Figure 17:
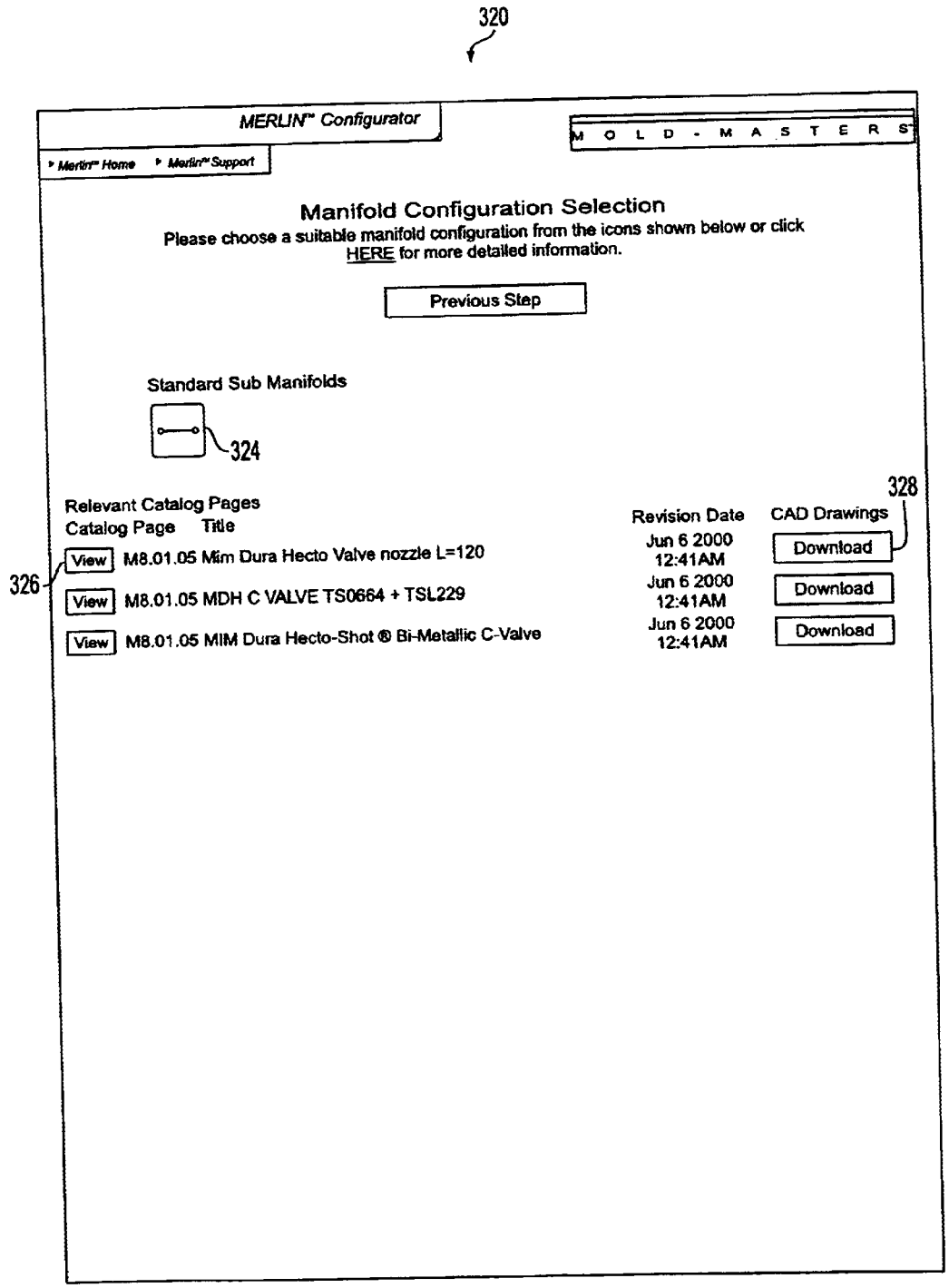

FIGS. 17 and 18 are illustrations of computer screen displays 320, 340 of the manifold configuration selection process as offered by a particular embodiment of the configuring subsystem 12 in accordance with the present invention. The computer screen display 320 which displays a manifold configuring selection screen is the next sequential step that the customer follows to configure an injection molding system based on their specific parameters. The customer can click on the graphical selection input standard sub-manifold 324 in order to enter the dimensions for a manifold using their parameters. The customer can either work with the recommendations of the configuring subsystem 12 which provides a manifold that could function with the system as defined up to this stage. Electronic versions of the configuring subsystem 12 recommendations for the manifold configurations can be viewed by clicking on graphical selection input 326. Corresponding CAD drawing for the recommended manifold can be downloaded by clicking on the graphical selection input download 328. If the customer wants to configure a manifold completely based on their specific dimensions, the customer can respond to a prompt in the screen display 340, and enter his dimensions in graphical selection input 342. Once again, if there are any relevant catalog pages of the electronic versions of the catalog, the customer can view them for the dimensions specified by activating the "view" graphical selection input 344. Drawings for the configuration can be downloaded by clicking on the graphical selection input 346.

Figure 19:
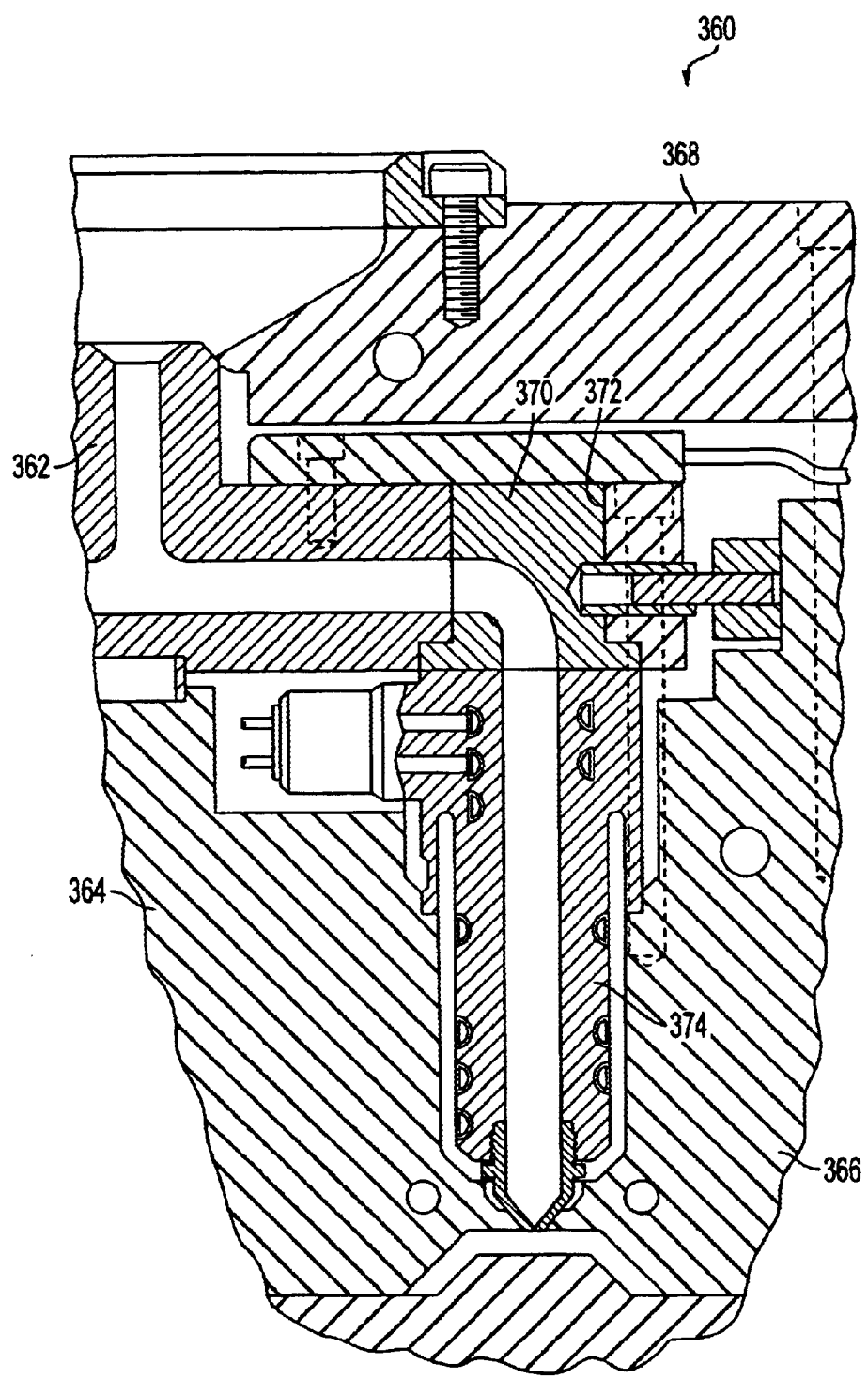
FIG. 19 is a sectional view showing a portion of a multi-cavity injection molding system with a melt distribution manifold according to one electronic catalog page offered by a particular embodiment of the configuring subsystem of the present invention.

FIG. 19 is a sectional view showing a portion of an illustrative multi-cavity injection molding system 360 with a melt distribution manifold according to one electronic catalog page offered by a particular embodiment of the configuring subsystem 12 in accordance with the present invention. The injection molding system 360 is described in a U.S. Pat. No. 5,366,369, which issued on Nov. 22, 1994 and is incorporated herein by reference. The multi-cavity injection molding system 360 has a steel melt distribution manifold 362 mounted in a mold 364 between a cavity plate 366 and a back plate 368. The customer can change many dimensions and can specify a manifold to suit her design, such as specifying the dimensions of a steel insert 370, which is removably located in a transverse opening 372 through the manifold 362 in alignment with each of the nozzles 374.

Figure 20:
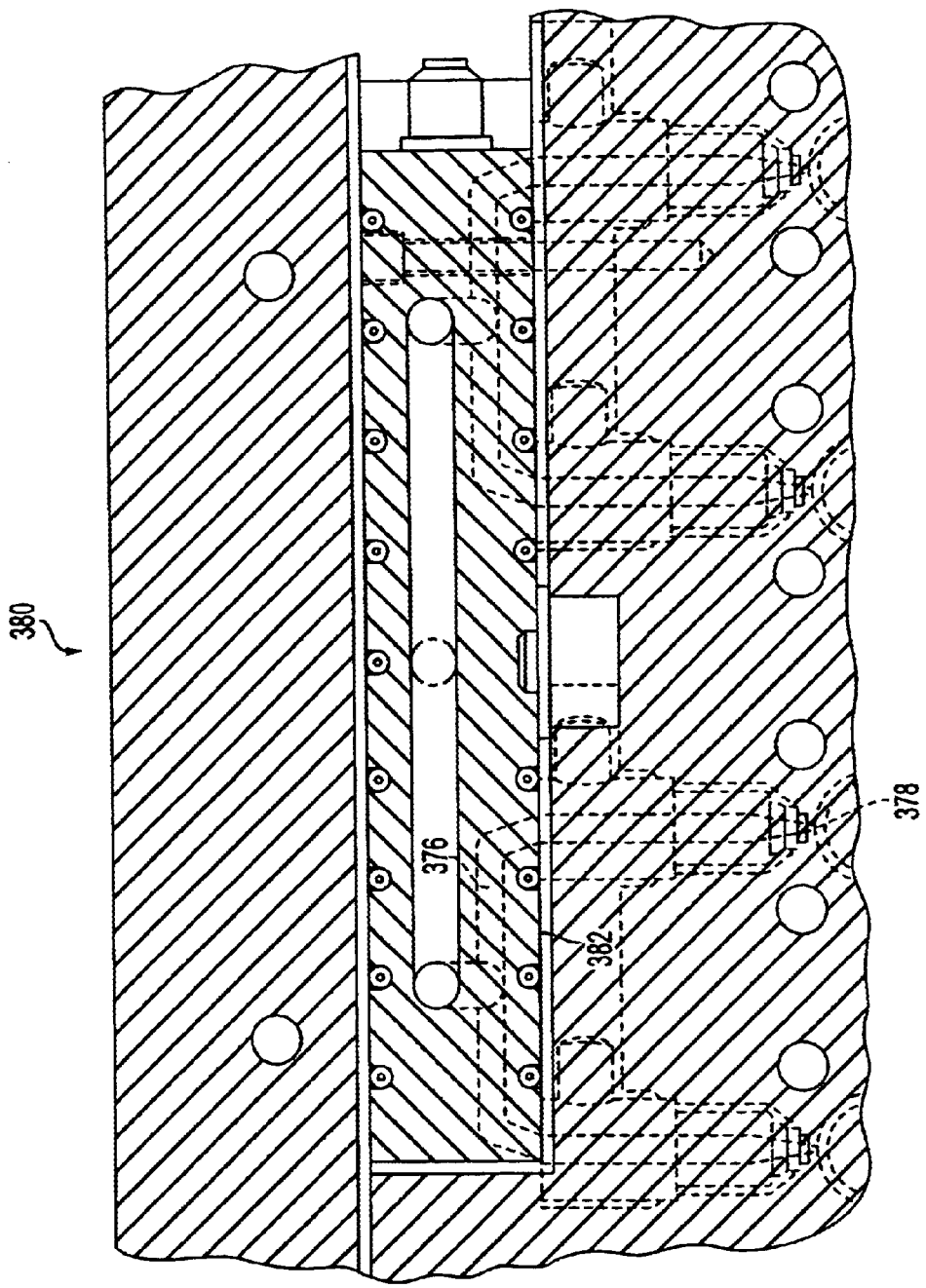
FIG. 20 is a sectional view of a portion of an injection molding system having four heated nozzle manifolds connected to a central manifold in a partially assembled mold according to one electronic catalog page as offered by a particular embodiment of the configuring subsystem of the present invention.

FIG. 20 is a sectional view of a portion of an illustrative injection molding system 380 having four heated nozzle manifolds connected to a central manifold in a partially assembled mold according to one electronic catalog page as offered by a particular embodiment of the configuring subsystem 12 in accordance with the present invention. The injection molding system 380 is described in a U.S. Pat. No. 5,707,664, which issued on Jan. 13, 1998 and is incorporated herein by reference. The injection molding system 380 includes four heated nozzle manifolds 382 connected to a heated central manifold. The arrangement of the various manifolds in connection with the bushing and the configuration of the melt passage 376 ensures that the length melt flow to each gate 378 in the system is exactly the same. The customer can change different dimensions of the manifold such as, length, width and height.

Figure 21:
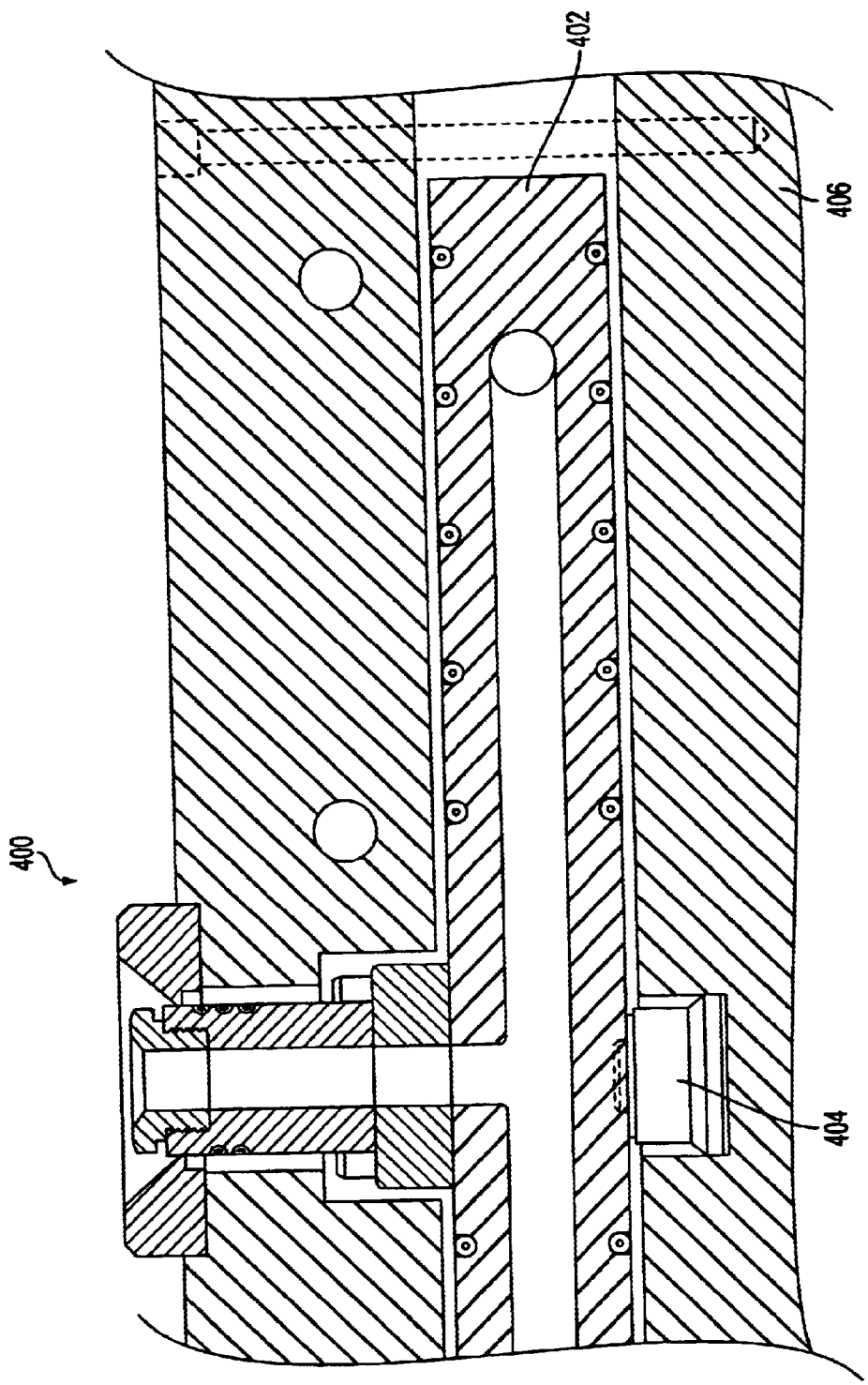
FIG. 21 is a sectional view showing a nozzle manifold after assembly of the mold has been completed as offered by one electronic catalog page of the configuring subsystem in accordance with a particular embodiment of the present invention.

FIG. 21 is a sectional view showing an illustrative nozzle manifold 400 after assembly of the mold has been completed as offered by one electronic catalog page of a particular embodiment of the configuring subsystem 12 in accordance with the present invention. The injection molding system 400 is described in a U.S. Pat. No. 5,705,202, which issued on Jan. 6, 1998 and is incorporated herein by reference. A manifold 402 is centrally located by a central locating ring 404 seated between it and a mold 406. The customer can change several of the dimensions of the manifold such as, the length, width and height of the manifold as well as the placement of the nozzles.

Figure 22:
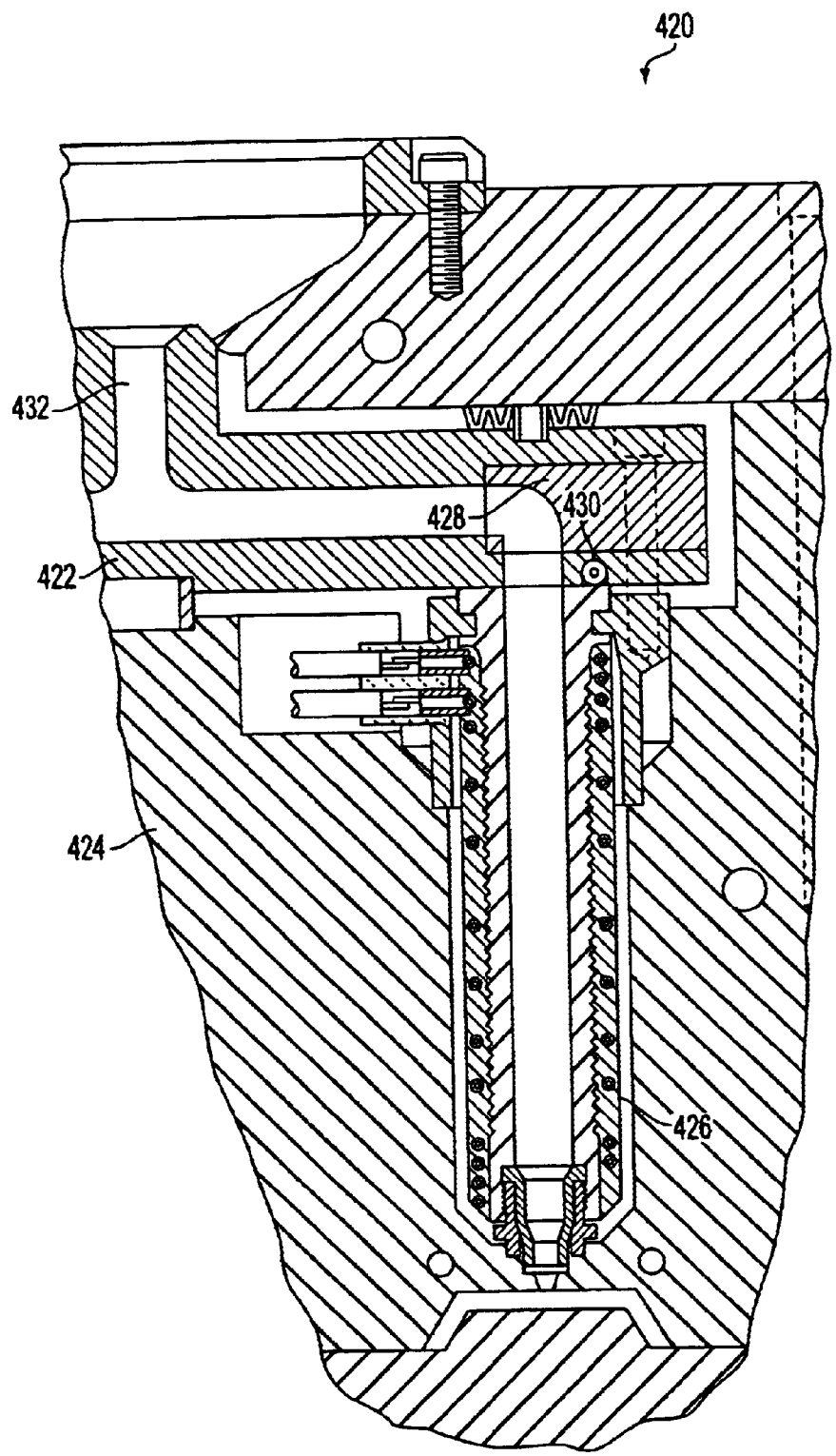
FIG. 22 is a sectional view showing a portion of a multi-cavity injection molding system with a melt distribution manifold according to one electronic catalog page offered by a particular embodiment of the configuring subsystem of the present invention.

FIG. 22 is a sectional view showing a portion of an illustrative multi-cavity injection molding system 420 with a meld distribution manifold according to one electronic catalog page offered by a particular embodiment of the configuring subsystem 12 in accordance with the present invention. The injection molding system 420 is described in a U.S. Pat. No. 5,441,197, which issued on Aug. 15, 1995 and is incorporated herein by reference. The melt distribution manifold 422 is normally mounted in a mold 424 to interconnect a number of spaced nozzles 426 to provide a multi-cavity injection molding system 420. The customer can make modifications to different portions of the system 420. In particular, the customer can specify the dimensions for portions such as, an elbow 428, the heating element 430, and but not limited to, an insulated inlet portion 432.

Figure 23:
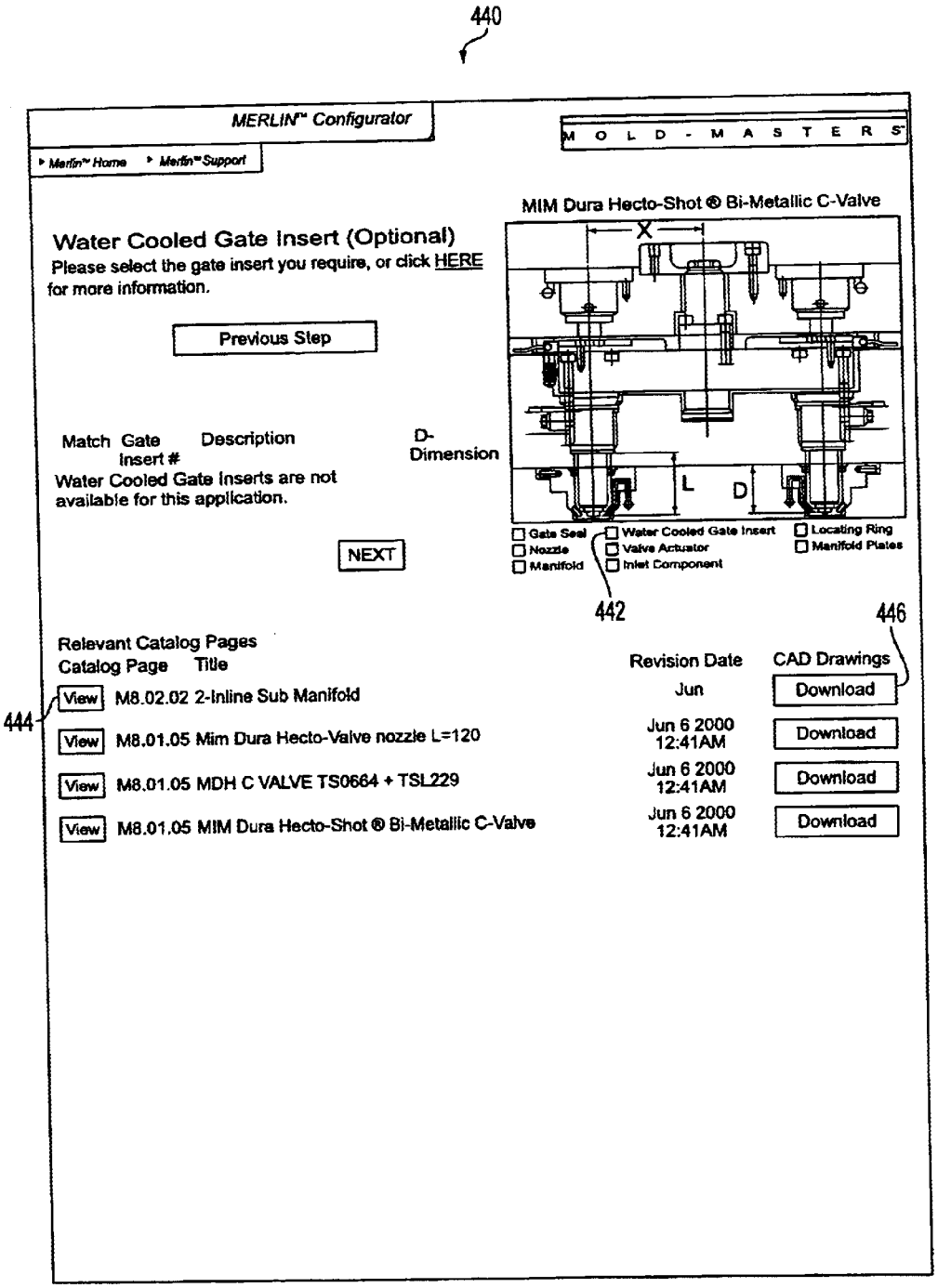
FIG. 23 is an illustration of a computer screen display of the gate insert selection process as offered by a particular embodiment of the configuring subsystem in accordance with the present invention.

FIG. 23 is an illustration of a computer screen display 440 of the gate insert selection process as offered by a particular embodiment of the configuring subsystem 12 in accordance with the present invention. The gate insert selection for example, selecting a water cooled gate insert 442 is the next sequential step a customer is guided through to configure an injection molding system. The customer can either choose a gate insert that the configuring subsystem 12 returns after doing some analysis, or the customer can specify a gate insert of their own dimensions. If the customer chooses to select a recommended gate insert, then they can view the different options using a graphical selection input, such as graphical selection input 444, that represents electronic versions of the catalog with representative information about the gate insert. In addition, the customer can access CAD drawings for the corresponding gate insert using the graphical selection input 446.

Figure 24:
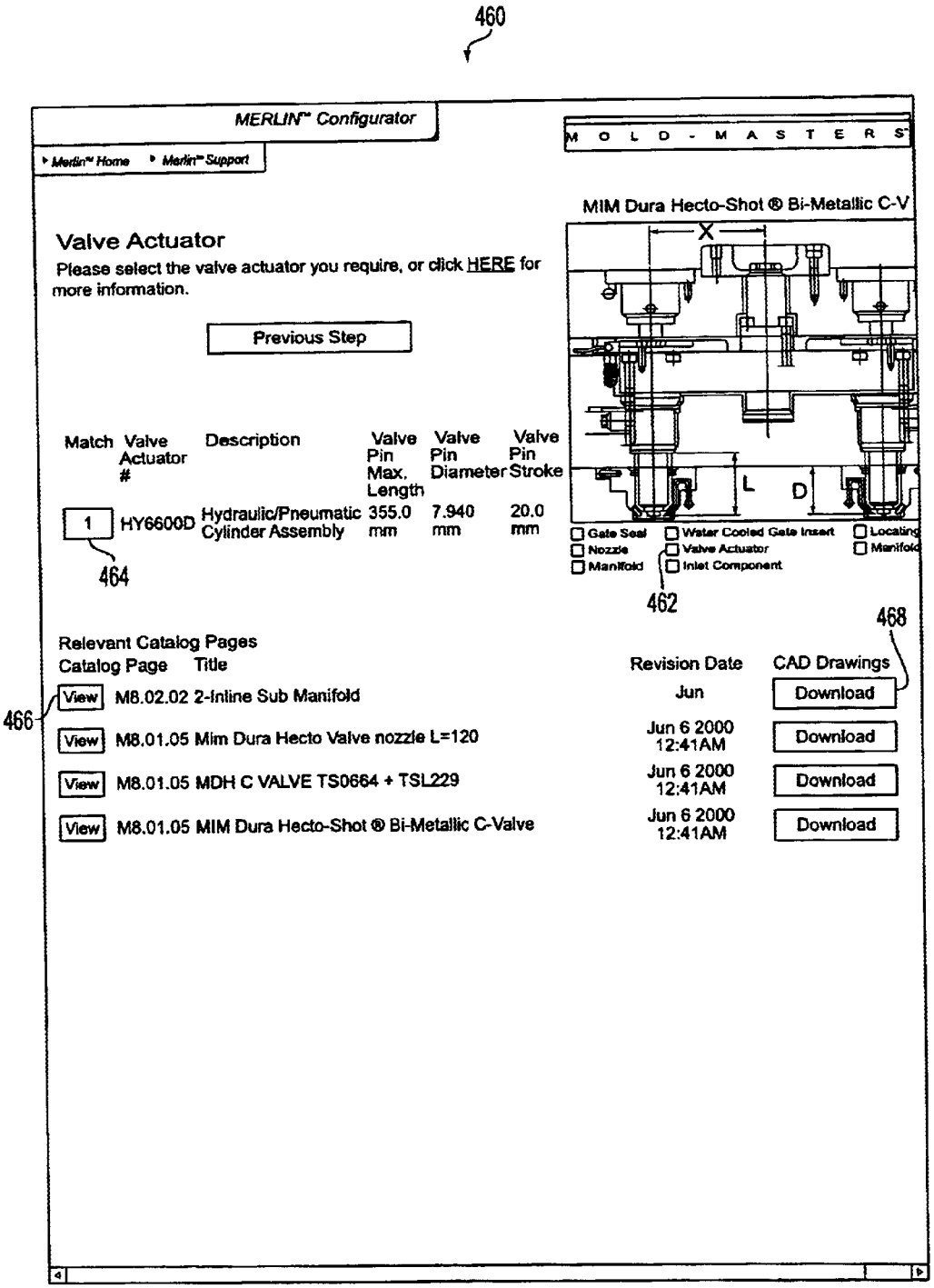
FIG. 24 is an illustration of a computer screen display of the value actuator selection process as offered by a particular embodiment of the configuring subsystem in accordance with the present invention.

FIG. 24 is an illustration of a computer screen display 460 of the value actuator selection process as offered by a particular embodiment of the configuring subsystem 12 in accordance with the present invention. The customer is guided to specify a value actuator 462 using either a recommended valve actuator provided by the configuring subsystem 12 or allowing the customer to specify the dimension of the valve actuator. If the customer choses to use the valve actuator as recommended by the configuring subsystem 12, she can access the recommendation by clicking on the graphical selection input 464 that provides relevant information regarding the dimensions and the functionality of the valve. Further, the customer can review electronic catalog pages of the recommended actuator using the "view" graphical selection input 464. The customer can also access the corresponding CAD drawing using the graphical selection input 468.

Figure 25:
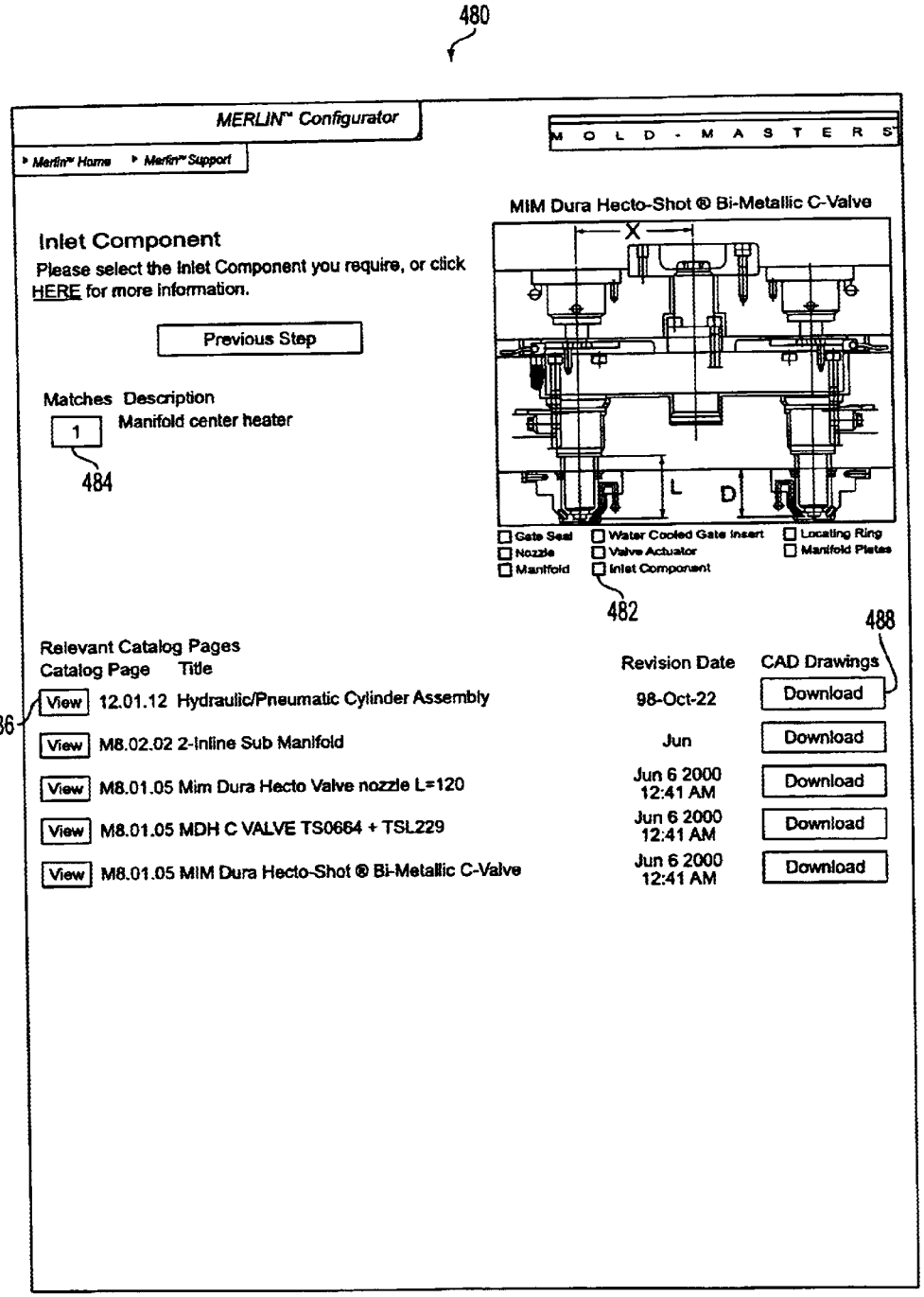
FIG. 25 is an illustration of a computer screen display of the inlet component selection process as offered by a particular embodiment of the configuring subsystem in accordance with the present invention.

FIG. 25 is an illustration of a computer screen display 480 of the inlet component selection process as offered by a particular embodiment of the configuring subsystem 12 in accordance with the present invention. The definition of the inlet component 482 is the next sequential step that the configuring subsystem 12 provides to a customer in order for her to configure a custom injection molding system. The configuring subsystem 12 provides a recommended inlet component such as, for example, the manifold center heater as displayed under match one in graphical selection input 484. If the customer selects a recommended inlet component, she can view the electronic version of the catalog which provides more information about the inlet component by clicking on the view graphical selection input 486. CAD drawing can be downloaded and viewed using the graphical selection input 488.

Figure 26:
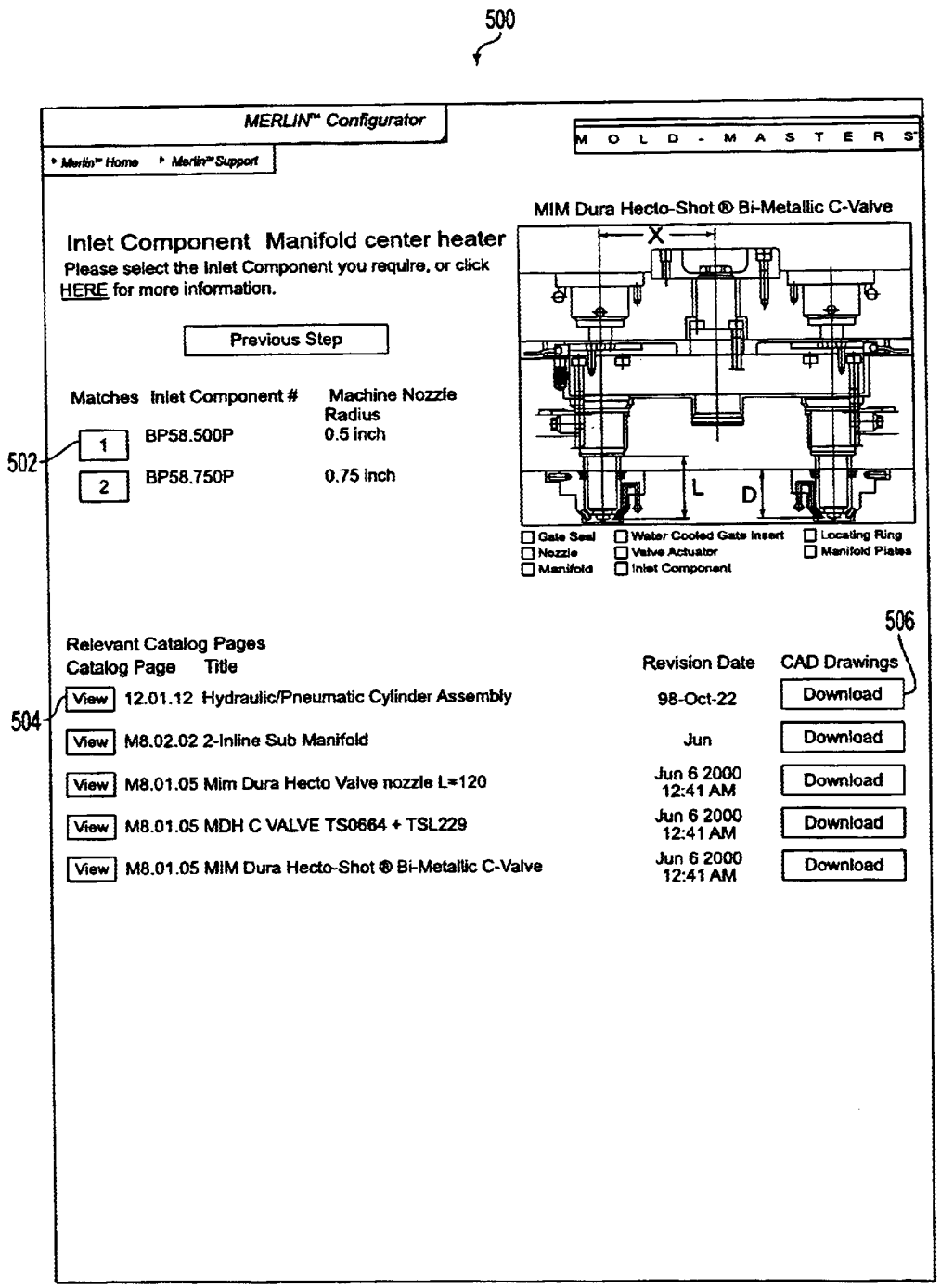
FIG. 26 is an illustration of a computer screen display of the inlet component manifold center heater selection process as offered by a particular embodiment of the configuring subsystem in accordance with the present invention.

FIG. 26 is an illustration of a computer screen display 500 of the inlet component manifold center heater selection process as offered by a particular embodiment of the configuring subsystem 12 in accordance with the present invention. The configuring subsystem guides the selection of additional inlet components for the system being specified by the customer such as, the inlet component manifold center heater. As described hereinbefore, the configuring subsystem 12 allows the customer to either use a recommended inlet component manifold center heater or specify the customer's own parameters. The recommendation provided by the configuring subsystem 12 can be viewed using the graphical selection input such as, for example, graphical selection input 502 which provides dimensions of the heater. Relevant catalog pages can be electronically accessed using the "view" graphical selection input 504 for each of the recommended inlet components. CAD drawing can be downloaded for the corresponding recommended components using the graphical selection input 506.

FIG. 27 is an illustration of a computer screen display 520 of the location ring selection process as offered by a particular embodiment of the configuring subsystem 12 in accordance with the present invention. The selection for the locating ring 522 is the next sequential step that the configuring subsystem guides a customer through in completing the definition of their injection molding system. The configuring subsystem 12 returns viable matches for the locating ring option such as, option 1 as shown in the graphical selection input 524. Relevant catalog pages such as a page that can be viewed by clicking on graphical selection input view 526 provides information from an electronic version of a catalog for each of the locating rings and components selected up to now. In addition, the CAD drawing corresponding to the locating ring can be accessed and downloaded using the graphical selection input download 528.

Figure 28:
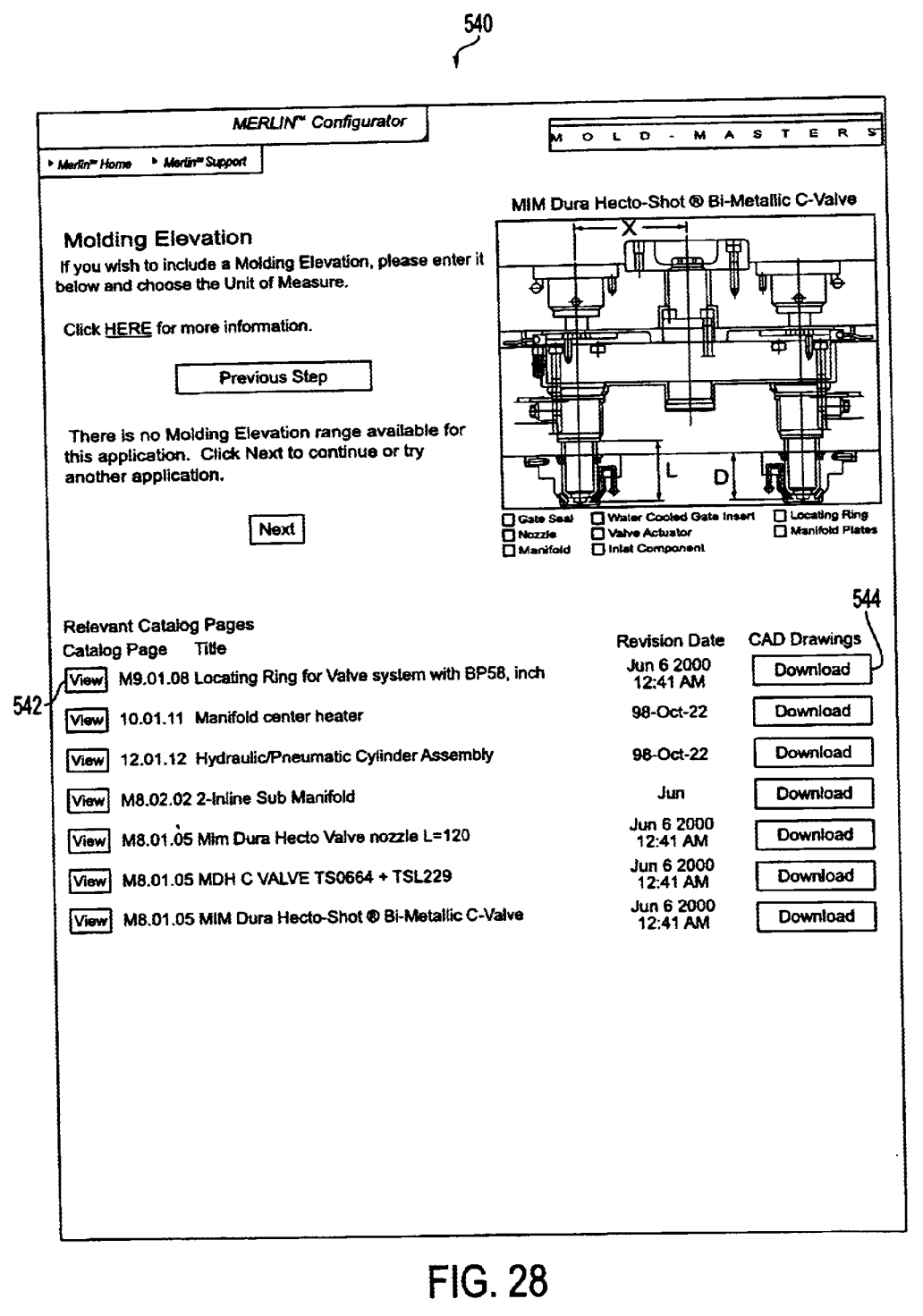

FIG. 28 is an illustration of a computer screen display 540 of the molding elevation selection process as offered by a particular embodiment of the configuring subsystem 12 in accordance with the present invention. A customer is queried as to the inclusion of a molding elevation. If the customer chooses to add information regarding molding elevation, he can enter the dimension into the configuring subsystem 12. The relevant catalog pages can be viewed by clicking on "view" graphical selection input 542 which provides electronic versions of the system components that comprise the system that has been configured by the customer. Corresponding CAD drawings for each of the component can be downloaded using the download graphical selection input 544.

FIG. 29 is an illustration of a computer screen display 560 of the customer information form as offered by a particular embodiment of the configuring subsystem 12 in accordance with the present invention. Once the customer has defined and configured his system as described with respect to the previous figures, the configuring process is followed by an information gathering process such as, for example, the application form being completed by the customer. The customer is prompted to fill out their name, address and reference number. The customer reference number is any number the customer wants to assign to itself. In addition, there are pull-down menus that support additional information that is gathered such as, process temperature 562, injection time 564, and gate cooling 566.

Figure 30:
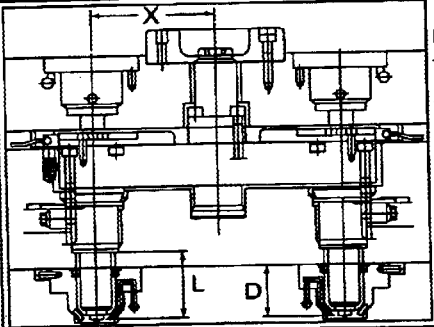
FIG. 30 is an illustration of a computer screen display of the summary information form as offered by a particular embodiment of the configuring subsystem in accordance with the present invention.

FIG. 30 is an illustration of a computer screen display 580 of the summary information form as offered by a particular embodiment of the configuring subsystem 12 in accordance with the present invention. The summary information form uses the information that has been inputted into the application information form as discussed with respect to FIG. 29 and provides verification to check the correctness of the inputted customer information. The summary information form provides different options to the customer for example, the customer is prompted to save the configured system using the "save" graphical selection input 582. Another option is to receive a quote for the configured system in terms of cost as provided using the "quote" graphical selection input 584. In addition, the customer is offered an option to have the configured system viewed by an application engineer by looking at an electronic file of the configured system, who ensures that the configured system is functionally sound and would not cause any safety or reliability concerns. The customer simply has to click the review graphical selection input 586 for an application engineer to get access to an electronic version of the configured system created by the configuring subsystem 12. In addition, the customer can place an order for the configured system simply by clicking on the graphical selection input "order" 588. Drawings for the customer showing the configured system can be generated and provided simply by clicking on the "generate drawing" graphical selection input 590. Towards the latter part of screen 580, a schematic of the configured system is displayed from the electronic version of the manufacturer catalog along with the summary information that was inputted as described with respect to the FIG. 29.

FIG. 31 is an illustration of a computer screen display 600 of the list of generated drawings offered by a particular embodiment of the configuring subsystem 12 in accordance with the present invention. If the customer has requested generated drawings for the configured system, a screen of generated drawing 600 is provided to the customer for either downloading or viewing online. The drawings come in several formats, such as, but not limited to, .tif format, .dxf format, .igs format, and .wrl format. The .wrl format provides a three dimensional virtual reality model of the configured system. Each of the figures for the respective formats either has a download option such as, by clicking graphical selection input 602 or a viewing option such as, by clicking viewing graphical selection input 604.

Figure 32:
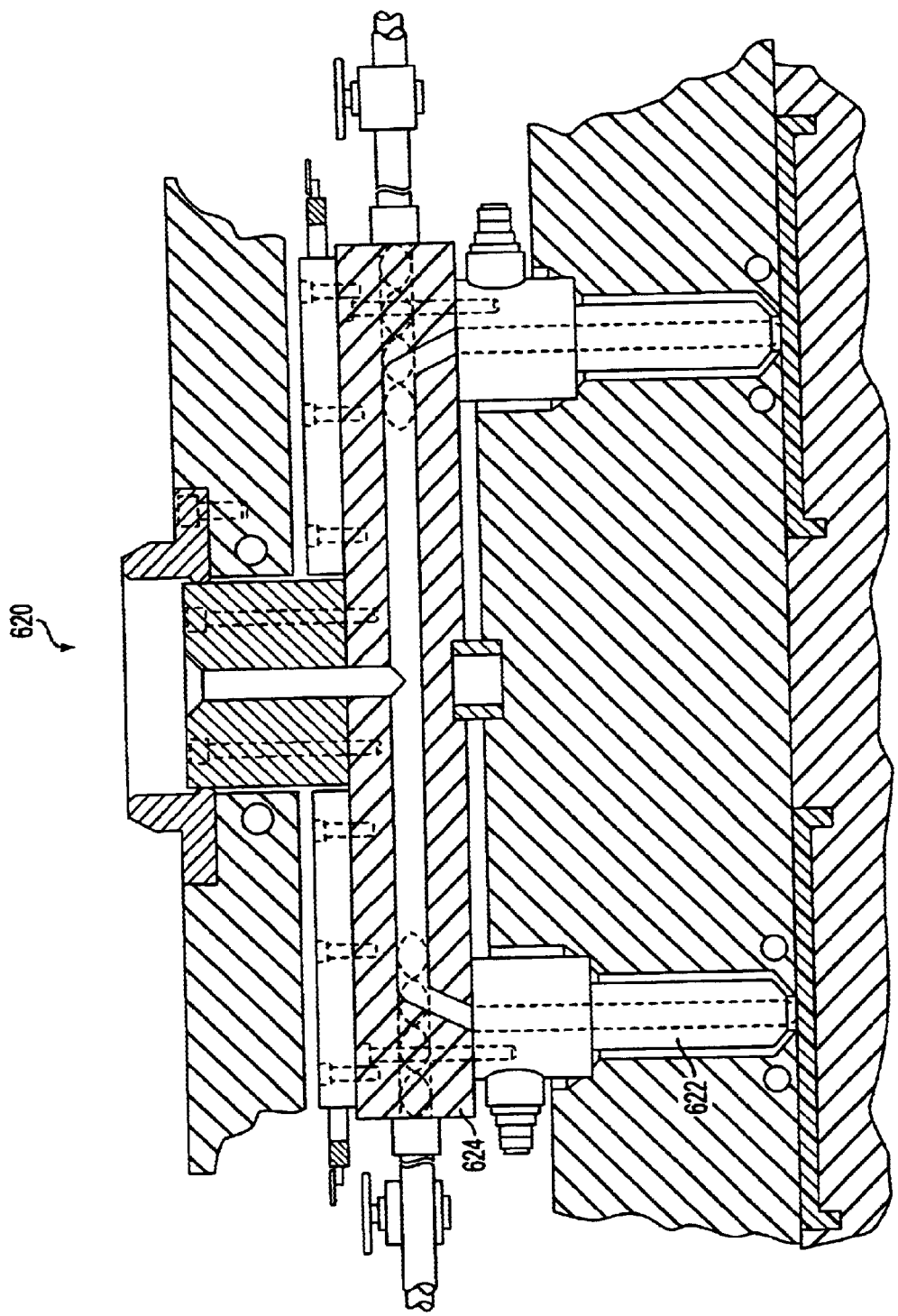
FIG. 32 is a sectional view of a multi-cavity injection molding system having a manifold as defined using a particular embodiment of the configuring subsystem in accordance with the present invention.

FIG. 32 is a sectional view of an illustrative multi-cavity injection molding system 620 having a manifold as defined using the configuring subsystem 12 in accordance with one particular embodiment of the present invention. The injection molding system 620 is described in a U.S. Pat. No. 5,007,821, which issued on Apr. 16, 1991 and is incorporated herein by reference. FIG. 32 is a representative drawing that a customer can access using the generated drawing option as discussed with respective FIG. 30. The multi-cavity injection molding system 620 has a number of heated nozzles 622 extending from a common heated manifold 624 as defined by the customer during the process of configuring the system as described with respect to FIG. 3 through FIG. 31.

Figure 33:
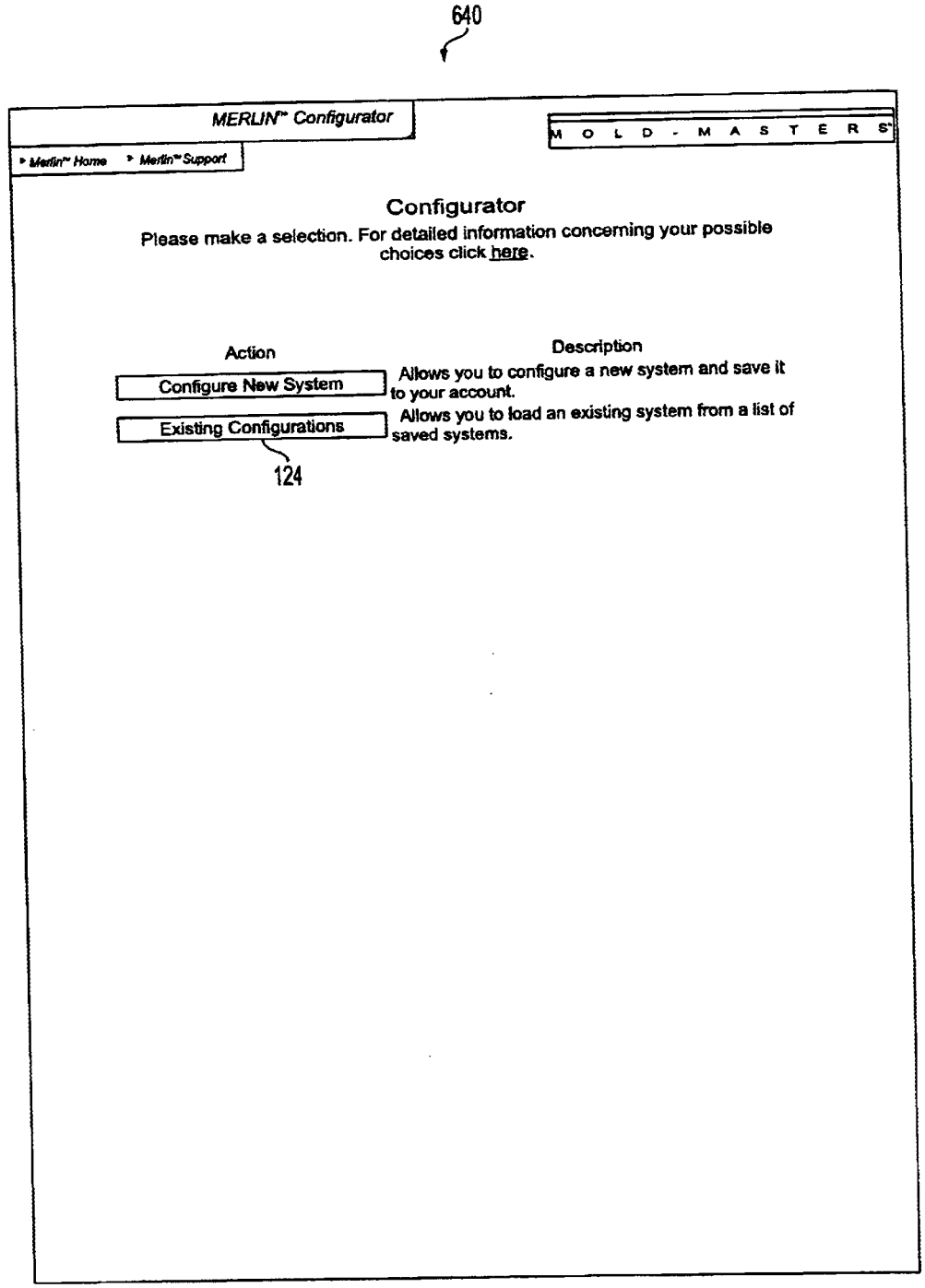
FIG. 33 is an illustration of a computer screen display of the configuring options selecting the existing configurations option as offered by a particular embodiment of the configuring subsystem in accordance with the present invention.

FIG. 33 is an illustration of a computer screen display 640 of the configuring options selecting the "existing configurations" option 124 as offered by a particular embodiment of the configuring subsystem 12 in accordance with the present invention. As discussed with respect to FIG. 5, the configuring subsystem 12 offers an option to access and view existing configurations from a list of saved systems. Once the customer has created a configured system, she can at a later time logon per the process described with respect to FIG. 3 and access the configuring option 124.

Figure 34:
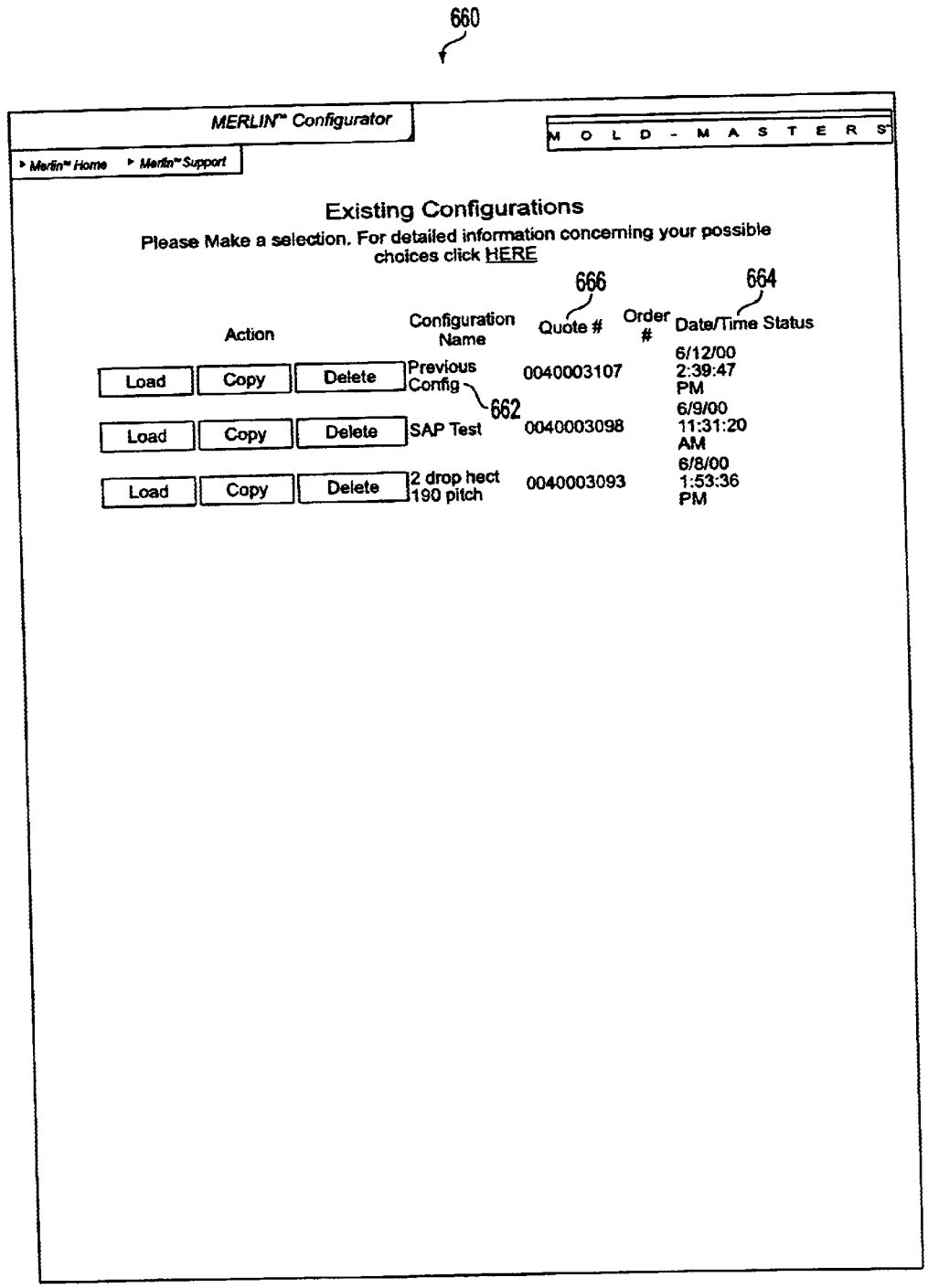
FIG. 34 is an illustration of a computer screen display of the existing configurations as offered by a particular embodiment of the configuring subsystem in accordance with the present invention.

FIG. 34 is an illustration of a computer screen display 660 of the existing configurations as offered by a particular embodiment of the configuring subsystem 12 in accordance with the present invention. The existing configuration screen display 660 accesses the existing configured system, such as the configuration "previous config" 662, as created with respect to FIG. 3 through FIG. 32. The customer can go in and check the status 664 and reference a quote number 666. The customer can also manipulate the existing configuration by either copying in order to create a new configured system or delete the existing configuration.

Figure 35:
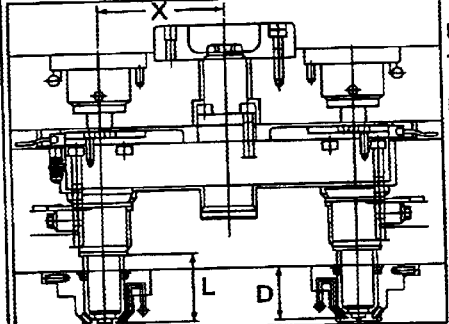
FIG. 35 is an illustration of a computer screen display of the summary information form as offered as a result of existing configurations option in accordance with one particular embodiment of the present invention.

FIG. 35 is an illustration of a computer screen display 680 of the summary information form as offered as a result of existing configurations option 124 in accordance with one particular embodiment of the present invention. Once the existing configuration has been selected using the previous screen 660 described with respect to FIG. 34, a summary information screen display 680 can be used by the customer to verify the information previously inputted and then take additional action in terms of either saving the configured system using the graphical selection input 682, getting a quote at this time for the configured system using the "quote" graphical selection input 684 or having the system previously configured be reviewed by application engineers by clicking on the "review" graphical selection input 686. The customer can at this point also just order the previously configured system using a graphical selection input 688. In addition, the customer can at this time request generated drawings displaying the configured system using the graphical selection input 670.

It should be noted that even though the methods discussed with respect to the FIGS. 3 through 35 have been presented as a sequential flow of configuring and ordering a system, the methods may include the user breaking the sequence by accessing previous screen displays or options to exit from each definition stage. The method and apparatus of the present invention is implemented without the need of any communication or human intervention between a purchasing party, such as the customer, and the personnel of the manufacturing party other than the communications provided by the computer-implemented system of the present invention. The method and apparatus of the present invention results in reductions to the cost and shortening of the schedule to design, configure, order and manufacture an injection molding system.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

Additionally, the system architecture depicted and described with respect to FIGS. 1, 2a and 2b has been chosen to best illustrate the overall functionality of the claimed invention. Splitting the functionality into a configuring subsystem, a business subsystem, a processing subsystem and a drawing subsystem was done for ease of discussion. Physically, these subsystems do not have to be separate and distinct subsystems with the functionalities assigned to each as described herein. It will be apparent to a person of ordinary skill in the relevant art how to implement alternative physical architectures comprising fewer or more subsystems which together perform the functionality described herein.

It will be apparent to those of ordinary skill in the art that methods involved in the automated injection molding configuring and manufacturing systems may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A computer implemented system connected to a computer network and accessible by a user or a plurality of users for designing, specifying and ordering customized injection molding systems, comprising in combination:

a configuring subsystem that uses one or more customer defined parameters and one or more manufacturing process determined parameters to generate a customized injection molding system which implements these customized design parameters; and a processing subsystem in communication with the configuring subsystem that processes the customized injection molding system generated by the configuring subsystem to provide drawings of the customized injection molding system.

2. The computer implemented system of claim 1, further comprising a business subsystem in communication with the configuring subsystem that calculates a cost for manufacturing the customized injection molding system and that determines a schedule for completing the customized injection molding system.

3. The computer implemented system of claim 1, wherein the processing subsystem further provides a bill of materials for the customized injection molding system.

4. The computer implemented system of claim 1, wherein the configuring subsystem is in communication with a web page server and the computer network.

5. The computer implemented system of claim 4, wherein the computer network is the Internet.

6. The computer implemented system of claim 1, further comprising a manufacturing subsystem in communication with the configuring subsystem that provides input for manufacturing the customized injection molding system generated by the configuring subsystem.

7. The computer implemented system of claim 1, wherein the configuring subsystem provides for verification of the customized injection molding system in terms of at least one of functionality and safety.

8. A computer implemented system connected with a computer network and accessible by a user or a plurality of users for designing, specifying and ordering customized injection molding systems, comprising in combination:
a configuring subsystem that uses one or more customer defined parameters and one or more manufacturing process determined parameters to generate a customized injection molding system which implements these customized design parameters; and
a business subsystem in communication with the configuring subsystem that calculates a cost for manufacturing the customized injection molding system and that determines a schedule for completing the customized injection molding system.

9. The computer implemented system of claim 8, further comprising a manufacturing subsystem in communication with the configuring subsystem that provides input for manufacturing the customized injection molding system generated by the configuring subsystem.

10. The computer implemented system of claim 8, further comprising processing subsystem in communication with the configuring subsystem, the processing subsystem processing the customized injection molding system generated by the configuring subsystem to provide drawings and information for a bill of material for the customized injection molding system.

11. The computer implemented system of claim 8, wherein the configuring subsystem is in communication with a web page server and the computer network.

12. The computer implemented system of claim 11, wherein the computer network is the Internet.

13. The computer implemented system of claim 8, wherein the configuring subsystem provides for verification of the customized injection molding system in terms of at least one of functionality and safety.

14. In a computer network-based system, an automated method for designing specifying and ordering customized injection molding systems, comprising the steps of:
receiving one or more customer determined parameters electronically;
generating an injection molding system with a computerized configuration subsystem that uses the one or more customer determined parameters and one or more manufacture process determined parameters for the injection molding system;
calculating a cost for manufacturing the injection molding system with a computerized business subsystem;
determining a schedule for completing the injection molding system with the computerized business subsystem; and
submitting the configured injection molding system for processing to a computerized processing subsystem.

15. The method of claim 14, further comprising the step of creating drawings of the configured injection molding system based on the one or more customer determined parameters and the one or more manufacture process determined parameters.

16. The method of claim 14, further comprising the step of creating a bill of materials based on the configured injection molding system.

17. The method of claim 14, further comprising the step of determining manufacturing parameters that include machine and tool codes based on the configured injection molding system.

18. The method of claim 14, further comprising the step of verifying the configured injection molding system in terms of at least one of functionality and safety.

19. A computer implemented system connected to a computer network for manufacturing customized injection molding systems, comprising in combination:
a computerized configuring subsystem for designing and a ordering customized injection molding system, the configuring subsystem using one or more customer defined parameters related to one or more components of the customized injection molding system, and one or more manufacture process determined parameters to generate the customized injection molding system;
a computerized business subsystem in communication with the configuring subsystems the business subsystem calculating a cost for manufacturing the customized injection molding system and determining a schedule for completing the customized injection molding system; and
a computerized manufacturing subsystem in communication with the configuring subsystem and the business subsystem, the manufacturing subsystem providing input for manufacturing the customized injection molding system generated by the configuring subsystem.

20. The system of claim 19, further including a computerized processing subsystem in communication with the configuring subsystem, the processing subsystem processing the customized injection molding system generated by the configuring subsystem to provide drawings of the customized injection molding system.

21. The system of claim 19, wherein the configuring subsystem provides for verification of the customized injection molding system in terms of at least one of functionality and safety.

22. In a computer-implemented process for manufacturing customized injection molding systems, a method comprising the steps of:
configuring a customized injection molding system to order by using one or more customer determined parameters and one or more manufacture process determined parameters to generate the customized injection molding system;
creating drawings for the customized injection molding system based on the one or more customer determined parameters and the one or more manufacturing process determined parameters;
calculating a cost for manufacturing the customized injection molding system;
determining a schedule for completing the customized injection molding system, ordering the customized injection molding system; and manufacturing the customized injection molding system based on the one or more customer determined parameters and the one or more manufacture process determined parameters.

23. The method of claim 22, further comprising the step of verifying the customized injection molding system by sending an electronic configuration file of the customized injection molding system to be verified in terms of at least one of functionality and safety.

24. A method for remotely designing specifying and ordering a customized injection molding system, comprising:

providing a web page server connected to a configuring subsystem network and to a digital network;

receiving one or more customer defined parameters for designing a customized injection molding system using the web page server over the digital network using a web browser program;

configuring an injection molding system based on the one or more customer defined parameters and one or more manufacture process determined parameters to generate the customized injection molding system;

creating drawings for the customized injection molding system based on the one or more customer determined parameters and the one or more manufacturing process determined parameter;

calculating a cost for manufacturing the customized injection molding system;

determining a schedule for completing the customized injection molding system; and ordering the customized injection molding system.

25. The method of claim 24, wherein the digital network is the Internet.

26. The method of claim 24, further comprising the step of dynamically displaying one or more web pages including at least one drawing of the customized injection molding system in response to a customer's request.

27. The method of claim 24, further comprising the step of dynamically displaying one or more web pages including at least one of the cost and schedule for the customized injection molding system.

28. A computer implemented system connected to a computer network and accessible by a user or a plurality of users for designing, specifying and ordering customized hot runner systems, comprising in combination:

a configuring subsystem that uses one or more customer defined parameters and one or more manufacturing process determined parameters to generate a customized hot runner manifold which implements these customized design parameters; and a processing subsystem in communication with the configuring subsystem that processes the customized hot runner manifold generated by the configuring subsystem to provide drawings of the customized hot runner manifold.

29. The computer implemented system of claim 28, wherein the configuring subsystem also uses the customized design parameters to generate a plurality of hot runner nozzles for connecting to the customized hot runner manifold.

30. A computer implemented system connected to a computer network and accessible by a user or a plurality of users for designing, specifying and ordering customized hot runner systems, comprising in combination:

a configuring subsystem that uses one or more customer defined parameters and one or more manufacturing process determined parameters to generate a customized hot runner manifold which implements these customized design parameters; and a business subsystem in communication with the configuring subsystem that calculates a cost for manufacturing the customized hot runner manifold and that determines a schedule for completing the customized hot runner manifold.

31. The computer implemented system of claim 30, wherein the configuring subsystem also uses the customized design parameters to generate a plurality of hot runner nozzles for connecting to the customized hot runner manifold.

* * * * *